United States Patent
Nataros et al.

(10) Patent No.: US 10,547,657 B2
(45) Date of Patent: Jan. 28, 2020

(54) SYSTEM AND METHOD FOR VIDEO GATHERING AND PROCESSING

(71) Applicants: Mark Nataros, Austin, TX (US); Joe Tydlacka, Cibolo, TX (US); Frank Nataros, Austin, TX (US)

(72) Inventors: Mark Nataros, Austin, TX (US); Joe Tydlacka, Cibolo, TX (US); Frank Nataros, Austin, TX (US)

(*) Notice: Subject to any disclaimer, the term of this patent is extended or adjusted under 35 U.S.C. 154(b) by 150 days.

(21) Appl. No.: 15/603,449

(22) Filed: May 24, 2017

(65) Prior Publication Data

US 2017/0346864 A1 Nov. 30, 2017

Related U.S. Application Data

(60) Provisional application No. 62/341,527, filed on May 25, 2016.

(51) Int. Cl.
*H04L 29/06* (2006.01)
*H04N 21/233* (2011.01)

(52) U.S. Cl.
CPC ............ *H04L 65/60* (2013.01); *H04L 65/607* (2013.01); *H04L 65/80* (2013.01); *H04N 21/233* (2013.01)

(58) Field of Classification Search
CPC ....... H04L 65/60; H04L 65/80; H04L 65/607; H04L 65/1076; H04L 65/4092; H04N 21/4361; H04N 21/4422; H04N 21/4728; H04N 21/233
USPC ................................................. 709/217, 231
See application file for complete search history.

(56) References Cited

U.S. PATENT DOCUMENTS

| | | | |
|---|---|---|---|
| 8,845,434 B2* | 9/2014 | Dietrich, Jr. ............ | A63F 13/12 463/20 |
| 2007/0214461 A1* | 9/2007 | Glatron ............. | H04L 29/06027 719/321 |
| 2011/0126255 A1* | 5/2011 | Perlman ................ | H04L 65/604 725/116 |
| 2011/0176790 A1* | 7/2011 | Morris ............. | H04N 21/43615 386/299 |
| 2012/0265847 A1* | 10/2012 | Swenson ............. | H04L 65/1076 709/217 |
| 2014/0297799 A1* | 10/2014 | Gordon ................... | A63F 13/12 709/217 |
| 2014/0344469 A1* | 11/2014 | Nicholls ............... | H04L 65/607 709/231 |
| 2015/0358577 A1* | 12/2015 | Zhou ....................... | H04L 51/10 348/14.01 |
| 2018/0295282 A1* | 10/2018 | Boyce ................. | H04L 65/4092 |

OTHER PUBLICATIONS

Chun BG, Ihm S, Maniatis P, Naik M, Patti A. Clonecloud: elastic execution between mobile device and cloud. InProceedings of the sixth conference on Computer systems Apr. 10, 2011 (pp. 301-314). ACM. (Year: 2011).*

* cited by examiner

*Primary Examiner* — James N Fiorillo

(57) ABSTRACT

A system and method to capture, generate and transfer processed graphics data, image data, audio data, and other data for smooth, high-performance presentation on portable or other devices with low overhead on all system(s) involved.

14 Claims, 7 Drawing Sheets

SYSTEM AND METHOD FOR VIDEO GATHERING AND PROCESSING

CITATION TO PRIOR APPLICATIONS

This application claims priority for purposes of this application to U.S. Provisional Application Ser. No. 62/341,527, entitled "System and Method for Video Gathering and Processing" filed May 25, 2016.

BACKGROUND

Technology now requires the delivery and display of high-level, high-performance graphics and video data. A problem arises, however, with the reduced size in portable electronics (e.g., mobile phones, tablets, laptop and notebook computers, etc.). The reduces size of these portable electronics result in limited functionality that can be included with the processor and/or device overall.

This problem is highly prevalent with games, particularly multi-player, real-time, interactive games run on such devices. A typical desktop gaming machine may include a graphics card that has large amounts of memory and one or more specialized graphics processing units (GPUs) specifically designed to handle a high volume of intense graphics processing. However, such graphics cards typically require a large amount of physical space and further require substantial power from the computer bus (some even requiring an additional or external power supply). Even where possible and practical to use, such specialized graphic cards are very expensive and cost significantly more than standard graphics cards. Consequently, such graphics cards are impractical for small portable electronics or other inexpensive devices.

One solution to this problem is offloading the graphics processing to computers and servers external to the portable electronic device. Further solutions include completely offloading the entire game (or program requiring intense graphics processing) to the server. In such implementations, the server receives control commands from the mobile device, runs the program and performs the graphics processing, and then returns the processed graphics to the mobile device for display.

The problem now presented by such implementations is one of "lag" due to a variety of reasons. One such reason is the inherent inability of the processing computer software configuration to process and output such graphics in a fashion fast enough for the resulting graphics to appear smooth when displayed on the mobile device. Other reasons may be the numerous software processes required prior to the graphics being transmitted to the portable electronic device. Such numerous processes and programs employed highly reduce the speed at which graphics can be output to the mobile device, therefore introducing higher latency and causing "lag." Lastly, high overhead on the portable electronics may still be required to interact with the remote server and process the incoming graphics feed.

Accordingly, improved systems and methods which place lower overhead on a portable device, yet are capable of transferring processed graphics data for a smooth presentation on the portable device remains highly desirable.

SUMMARY

Embodiments overcome the disadvantages of the prior art. For example, embodiments are able to transfer processed graphics data, image data, audio data, and other data for smooth, high-performance presentation on portable devices with low overhead. These advantages and others are provided, for example a method of video gathering and processing that loads a base configuration, detects an environment in which video frames will be generated and displayed, notes a user connection or file/data stream output start, initializes required global memory and data objects, loads a required graphics module based on base configuration and detected environment, loads a specific configuration related to run-time of a specific graphics case, initializes drivers, DLLs, kernel drivers, and all base low level or GPU-related memory objects and hooks that will be used by the loaded graphics module, initializes threads for tasks such as graphics pulls, image manipulation and encoding, initializes per frame memory and data objects, captures raw source image data or image location for the video frames, moves raw source image data or image location into encoder, encodes video frame data from the raw source image data, sends encoded video frame data to network stack and streams encoded video frame data packets.

BRIEF DESCRIPTION OF THE DRAWINGS

The following figures are included to illustrate certain aspects of the present invention, and should not be viewed as an exclusive embodiments. The subject matter disclosed is capable of considerable modification, alteration, and equivalents in form and function, as will occur to one having ordinary skill in the art and the benefit of this disclosure.

DETAILED DESCRIPTION

Figure 1:
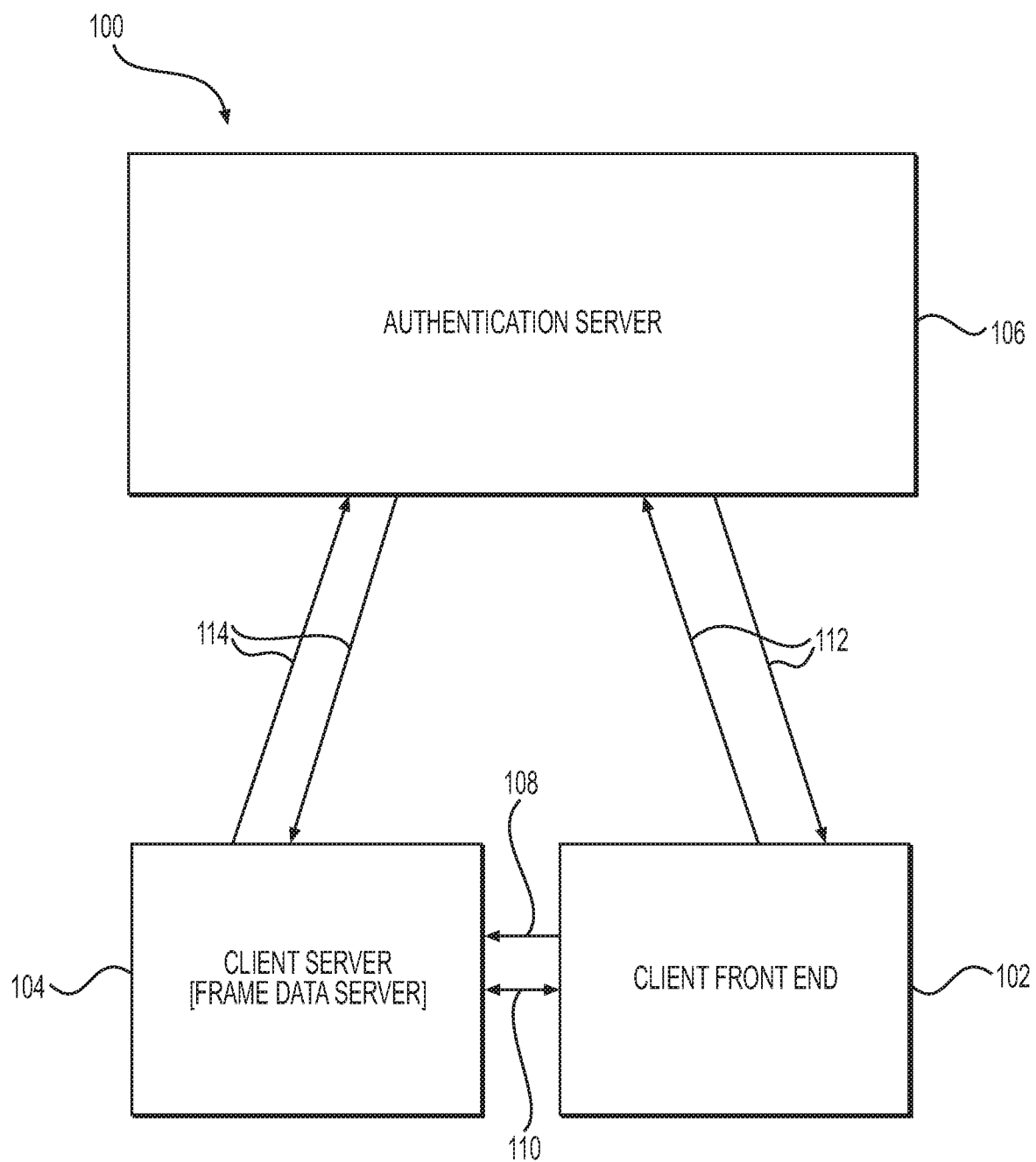
FIG. 1 is a block diagram illustrating a data transfer and video frame serving system, according to one or more embodiments.

Described herein are embodiments of a system and method for video gathering and processing. Embodiments overcome the problems described above. Embodiments greatly reduce video streaming overhead. Embodiments provide a system and method for high-performance video gathering and processing. Embodiments provide a system and method for kernel/driver level video operations. Embodiments may be implemented using a data transfer and video frame serving system.

As used herein, a "processor" may be comprised of, for example and without limitation, one or more processors (each processor having one or more cores), microprocessors, field programmable gate arrays (FPGAs), application specific integrated circuits (ASICs) or other types of processing units that may interpret and execute instructions as known to those skilled in the art.

As used herein, "memory" may be any type of storage or memory known to those skilled in the art capable of storing data and/or executable instructions. Memory may include volatile memory (e.g., RAM, VRAM, etc.), non-volatile memory (e.g., harddrives), or a combination thereof. Examples of such include, without limitation, all variations of non-transitory computer-readable hard disk drives, inclusive of solid-state drives. Further examples of such may include RAM external to a computer or controller or internal thereto (e.g., "on-board memory"). Example embodiments of Memory, EPROM, ROM, or various other forms, or any combination thereof generally known as memory or RAM. The RAM, hard drive, and/or controller may work in combination to store and/or execute instructions.

Referring now to the drawings, wherein like reference numbers are used herein to designate like elements throughout the various views and embodiments of a unit. The figures are not necessarily drawn to scale, and in some instances the drawings have been exaggerated and/or simplified in places for illustrative purposes only. One of the ordinary skill in the art will appreciate the many possible applications and variations based on the following examples of possible embodiments. As used herein, the "present disclosure" refers to any one of the embodiments described throughout this document and does not mean that all claimed embodiments must include the referenced aspects.

With reference now to FIG. 1, shown is exemplary embodiment of a data transfer and video frame serving system 100. Embodiments may include a core software suite comprised of many sub-applications and drivers operating at various levels across multiple systems. Video data and video frame data, as used herein, may include computer-generated graphic video frame data, actual video frame data and other video frame data. Likewise, data transfer and video frame data serving system 100 may send other, non-video frame data, such as audio data, command or control data, text data, etc., with or without video frame data.

As depicted, the system 100 includes a client front end 102, a frame or client server 104 and an authentication server 106. For example and without limitation, the client front end 102 may be software running on (or may be) a desktop computer, a more portable computing device, such as a laptop, tablet, iPad, cellular telephone or the like, or another computing device. Client front end 102 is typically directly accessed and used by a user to access and view data or software, such as streaming data. The client front end 102 may be also referred to as the end client 102.

The frame server 104 is the primary software running on the primary computer with which the client front end 102 communicates. The frame server 104 may provide video frame data, and other data, to be sent and/or streamed to the client front end 102. The frame server 104 similar to the client server 104, may also include software which the client front end 102 wishes to access; the video frame data and other data served by the frame server 104 may include video frame data (corresponding to video frames and/or portions thereof), audio data, and other data from the software. Such software may include, for example, video- and/or graphic-intensive computer games or videoconference environments accessed by multiple end clients 102. The client server 104 may include any type of server known to those skill in the art, including but not limited to, one or more desktop server, blade server, or cloud computing network.

In some embodiments, the system 100 further includes the authentication server 106. Authentication server 106 may be software running on, for example and without limitation, one or more desktop server, blade server, or cloud computing network. The authentication server 106 may be a separate computer from the frame server 104, while in other embodiments, the frame server 104 and the authentication server 106 may be hosted or run on the same server hardware. In embodiments, authentication server 102 may be configured to control or mediate) the encryption mode for one or more parts of system 100 and one of more data streams or communication channels described herein.

In the embodiment shown, frame server 104 and authentication server 106 are software hosted and/or run on the same server hardware. The hardware on which frame server 104 and authentication server 106 run may be, for example, one or more servers, as described above. Indeed, frame server 104 and authentication server 106 may be one or part of one program, which may include other functionality. Hardware on which frame server 104 and authentication server 106 are implemented ("hardware or host hardware systems") may be as shown and described with reference to FIG. 5. For example, frame server 104 and authentication server 106 may be implemented and/or run on one or more GPUs. Furthermore, in embodiments, frame server 104 may perform some or all of the authentication and encryption functionality of authentication server 106.

In embodiments, system 100 components, client front-end 102, frame server 104 and authentication server 106, may be run on different, same or combinations of different or same host hardware systems. Likewise, embodiments may include configurations other than those shown in FIG. 1 or described herein. Additionally, the number of system 100 components may vary. For example, embodiments may include m client front-ends 102 connected to m authentication servers 106 connected to o frame servers 104, where m=1 to M, n=0 to N (an embodiment may omit the authentication server 106), and o=1 to 0, where M, N and O may equal any large numbers conceivably implementable. For example, M may be 10 million (or larger), N=10 and O=100. As is apparent, M, N and O do not need to equal each other.

The client front end 102 is communicably coupled to the frame server 104 via a first communication channel 108. Upon a successful connection with the frame server 104, a pipe or data stream 110 is established there between which transfers a substantial majority of the data. The client front end 102 is further communicably coupled to the authentication server 106 via a second communication channel 112. The system 100 further includes a third communication channel 114 between the authentication server 106 and the frame server 104. The third communication channel 114 can be used to register the frame server 104 with the authentication server 106, and for the authentication server 106 to send licenses to the frame server 104. In one embodiment, one or more of the first, second, and/or third communication channel, 108, 112, and 114, accordingly, can be implemented using encryption methods, such as RSA, as known to those skilled in the art.

In an exemplary operation, after the authentication server 106 has booted up and after the frame server 104 has booted up, a secure connection is established there between via the third communication channel 114. During or shortly after the established connection, the frame server 104 may communicate information to the authentication server 106, such as the frame server's 104 specifications, unique ID, or other information enabling the authentication server 106 to recognize the frame server 104. The authentication server 106 takes this information and may determine a particular set or subset of client front ends 102 which will be allowed to connect to the frame server 104.

With continuing reference to FIG. 1, the client front end 102 also connects to the authentication server 106, doing so via the second communication channel 112. In one embodiment, the client front end 102 sends (e.g., encrypted) information to the authentication server 106 such as a user name and login password. Upon approval of the client front end 102 credentials, the authentication server 106 may return a list of available client servers 104 to which the client front end 102 may connect and which the client front end 102 may use. The client front end 102 (or user thereof) selects a frame server 104 and such a selection is returned to the authentication server 106. The client front end 102 and the frame server 104 instantiate the first communication channel 108, and then may instantiate the data stream 110.

With continuing reference to FIG. 1, in embodiments main discrete software of (or running on) the frame server 104 may include (following components may be, e.g., drivers, other applications or simply executable sets of code):

Server Launcher. Front-end software.
  Launches frame server 104 and allows client front end 102 to establish communication channel with frame server 104.
Frame Server Data Service Library. Front-end software.
  Library of data services performed by frame server 104. Handles communication to authentication server 106.
Cryptographic Services. Includes both front-end and back-end software.
  Primary drivers which handle all major encoding and decoding of data. In embodiments, frame server 104 includes a cryptographic services and cryptographic driver(s) for both the server launcher side (front-end software) as well as the lower level side (back-end software). These drivers may operate with slight differences or optimizations, to allow for better optimization of the encoding/decoding presented to each cryptographic driver during operation.
User Command Decoding and Forwarding Services. Includes both front-end and back-end software.
  Encodes/decodes user interface data being sent between applications or forwarded out on the network, such as mouse motion or keyboard keys. In embodiments, determines how to replay these functions as either kernel level forwarding or Operating System ("OS") level forwarding.
Audio Encoder. Front-end software.
  In embodiments, primary application/driver to interface directly with sound hardware (if any) and OS to gain access to sound frame data, as low level as possible. In embodiments, is the source of the audio data.
Video Frame Encoder. Back-end software.
  Primary application/driver to interface directly with GPU and OS to gain access to video frame data, as low level as possible. In embodiments, this is the source of the video frame data.
  In embodiments, operates sub-applications and calls interface directly with GPU and CPU resources, in some cases using driver calls, in other cases accessing those resources directly to avoid poorly functioning driver calls.
  In embodiments, video frame encoder calls avoid driver interface as much as possible so that frame server 104 directly accesses the hardware memory or processing cycles to greatly improve efficiency. Consequently, video frame encoder calls may include a mix of standard graphics calls and custom low level calls. One example of the several cases which may be implemented by video frame encoder, includes frame server 104 creating objects memory space directly on the GPU memory blocks as opposed to standard driver created objects, allowing video frame encoder to get around and avoid driver limitations and driver bugs.
Frame Filter. Back-end software.
  Post and Pre-processing of video frame data that cannot be handled on the GPU directly in the same subset of memory that the core frame memory tables are located. Embodiments may omit this in favor of further optimization and further low level hardware interaction. However, embodiments may include frame filter for CPU processing and generic GPU processing when specific low level GPU resources are not available.
Core inner communications framework. Back-end software.
  Handles sending messages and maintaining memory pipelines between drivers and application running.
Main Data Processing Server. Back-end software.
  Pack and send as well as receive and unpack network data across the transmission to other software suites. In embodiments, data processing server is major 'DATA' networking processing component for all core data (e.g., frames, keyboard, mouse, etc.).
  Manages run-time of other non-Kernel back-end software.
System Resources
  In embodiments, manages some bulk OS level operational calls.
Kernel interface. Back-end software.
  Allows other applications/drivers to send and receive data to and from the Kernel level drivers.
  Kernel level drivers allow frame server 104 to bypass OS security as well as standard OS buffers and lag associated with using front-end device drivers or device replay options built into the operating systems. Embodiments also allow frame server 104 to gain access to full trusted root OS level memory which is used for greatly reducing overhead and delays, as well as doing things not intended to be possible by the OS' design, such as interface with UAC controls.
Kernel Mouse Driver. Back-end software.
  Allows for the direct input of mouse functions to low level Kernel memory, consequently making the host computer system think there is a USB device physically attached to the system.
Kernel Keyboard Driver. Back-end software.
  Allows for the direct input of mouse functions to low level Kernel memory, consequently making the host computer system think there is a USB device physically attached to the system.
Kernel Joystick Driver. Back-end software.
  Allows for the direct input of mouse functions to low level Kernel memory, consequently making the host computer system think there is a USB device physically attached to the system.
Kernel 'Multi interface" Driver. Back-end software.
  This driver covers multi-touch screens, and other similar secondary input devices such as thermal sensors, etc. This driver may be split up into multiple drivers associated with specific secondary input devices, if performance requirements require it to allow for further pipeline optimization. Allows for the direct input of multi-touch screen and other similar secondary input devices functions to low level Kernel memory, consequently making the host computer system think there is a USB device physically attached to the system.

Kernel Security Driver. Back-end software.

This allows operation of smart cards, and other security devices, to be operated over the network but still function as though plugged into the physical system.

Embodiments of frame server 104 may omit one or more of the components above as well as include other components not listed. Likewise, the components listed above may include additional functions and may omit functions described above.

Front-end software, as used throughout the description herein, refers to software with which a user, e.g., client front-end 102 or frame server 104 user, may interact. In embodiments, the front-end of the authentication suite of software 106, when used, may refer to the part that a standard "system administrator" would interact with in or during day-to-day operations (i.e., normal operations) and not lower level or back-end drivers, etc., with which the system administrator does not normally directly interact. In a case in which an authentication server 106 is running together with a frame server 104 and a user is acting as both a frame server 104 user and a system administrator, the software normally used by the user would simply be referred to as part of system admin tasks (see FIG. 3 below). Back-end software refers to lower level system software with which user, including client front-end 102 or frame server 104 users and authentication server 106 system administrators, does not interact on a day-to-day basis (i.e., normal operations).

With continuing reference to FIG. 1 embodiments of authentication server 106 may include (following components may be, e.g., drivers, other applications or simply executable sets of code):

Encryption Tool Suite.

This is a small collection of software and drivers which handle the encryption and decryption protocols of all communication between clients (frame server(s) 104 and client front end(s) 102) and the master authentication server (see below). Embodiments also include the option to interface with other applications such as LDAP or other user identification/user account resources.

Master Authentication Server.

In embodiments, core authentication server, which may be implemented as an application suite. May track and record all client front end(s) 102 and frame server(s) 104 and overall health of the nodes and act as a gate keeper and bridge builder for all communications. In embodiments, software keeps track of and authenticates all users as well as provides all licenses for software other than itself.

In embodiments, entire master authentication server application suite may be bypassed in some 'Demo' modes. Is intended for use in most 'Retail' applications.

Network Interface Library/Data Services Library.

Embodiments may include an extensive network library (the bulk of which is in WCF, though some non-WCF components exist to support specific client cases) which covers all communication and data services to and from the master authentication server.

In embodiments, also handles patch and other update version verification for frame server 104 and client front end 102 software.

Embodiments of authentication server 102 may omit one or more of the components above as well as include other components not listed. Likewise, the components listed above may include additional functions and may omit functions described above.

With continuing reference to FIG. 1, embodiments of client front end 102 may include (following components may be, e.g., drivers, other applications or simply executable sets of code):

End Client Launcher. Front-end software.

This is a front end that allows the user to interact with something, launching client front end 102 and establishing communications channel with frame server 104.

Frame Server Data Service Library. Front-end software.

In embodiments handles communication to the authentication server 106 and/or frame server 104.

Cryptographic services. Includes front- and back-end software.

In embodiments, primary driver which handle all major encoding and decoding of data. Cryptographic services software may include a driver for on both the end client launcher side (front-end software) as well as the lower level side (back-end software). In embodiments, these drivers operate with slight differences, to allow for better optimization of the encoding/decoding presented to each drive during operation.

User Command encoding and forwarding service. Back-end software.

Encodes user interface data being sent between applications or forwarded out on the network, such as mouse motion or keyboard keys. For example, captures user interface events such as a key press and forwards them onto the outgoing network stack.

Audio Decoder. Back-end software.

In embodiments, primary application to interface directly with sound hardware (if any) and OS to gain access to replay sound frame data.

Video Frame Decoder. Back-end software.

In embodiments, primary application to interface directly with GPU and OS to gain access to replay the frame data, as low level as possible.

May operate sub-applications and calls that interface directly with GPU and CPU resources, in some cases using driver calls, in other cases accessing those resources directly to avoid poorly functioning driver calls.

Core inner communications framework. Back-end software.

May handle sending messages and maintaining memory pipelines between drivers and application running.

Main Client. Is back-end software suite.

Packs and sends as well as receives and unpacks network data across the transmission to other software suites. In embodiments, main client is the major 'DATA' networking process for all core data (e.g., frames, keyboard, mouse, etc.).

In embodiments, manages run-time of other non-Kernel 'Back End' software.

System Resources

Manages some bulk OS level operational calls for client front end 102.

Embodiments of client front end 102 may omit one or more of the components above as well as include other components not listed. Likewise, the components listed above may include additional functions and may omit functions described above.

Figure 2A:
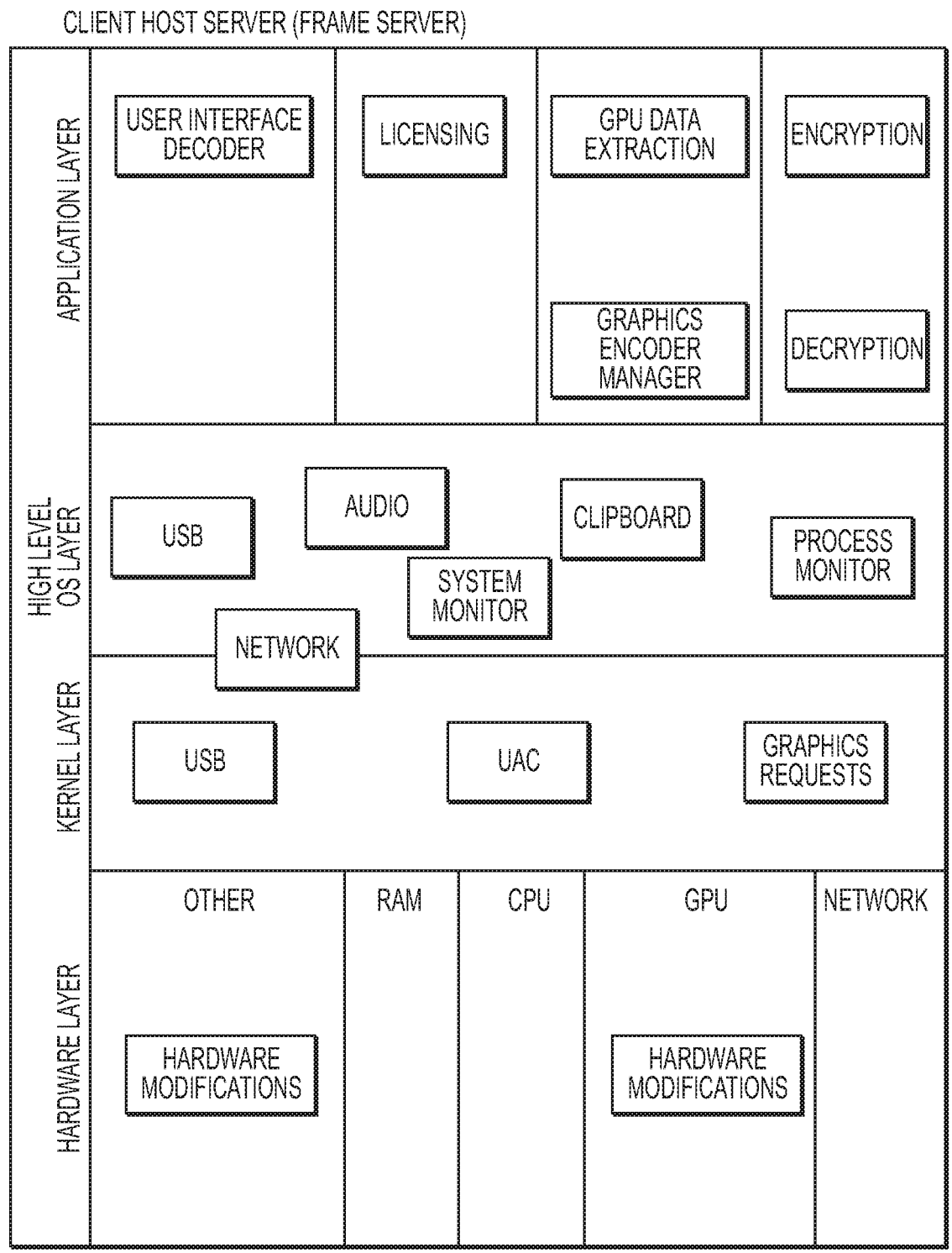
FIGS. 2A-2C are diagrams illustrating logical and functional architectural locations of data transfer and video frame serving system software components, according to one or more embodiments of data transfer and video frame serving system.
Figure 2B:
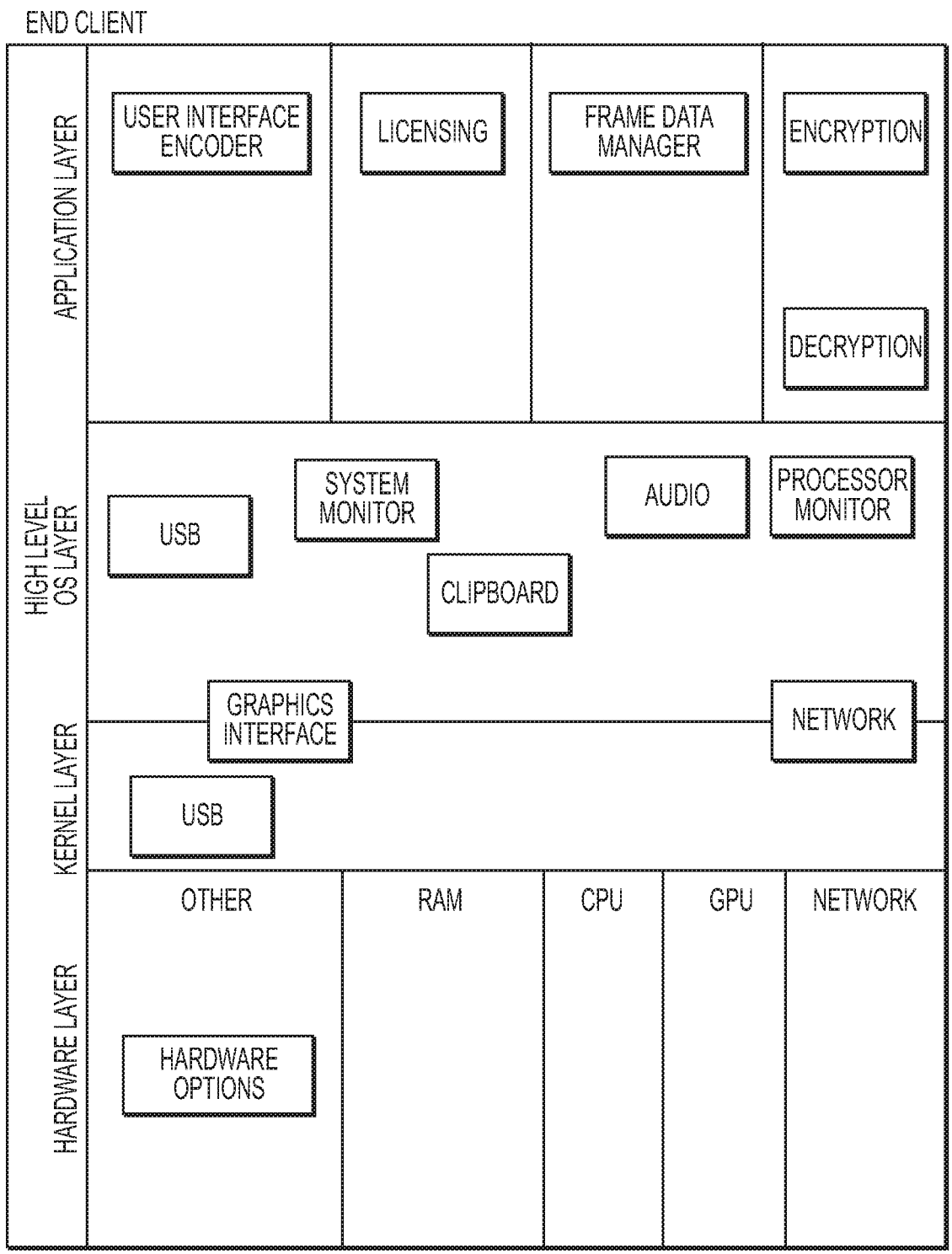
Figure 2C:
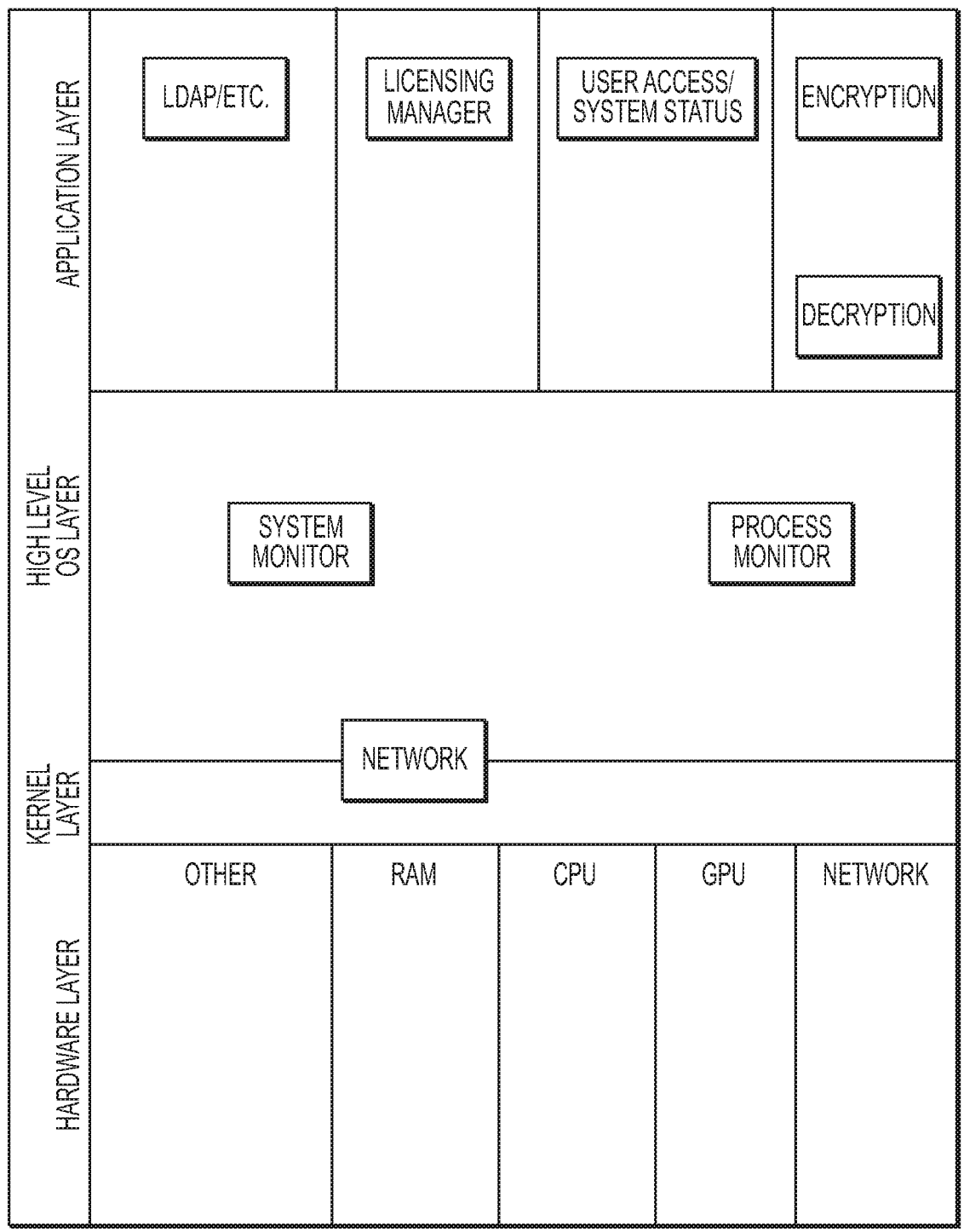

With reference now to FIGS. 2A-2C, shown are diagrams showing the location (logically) of frame server 104, client front-end 102 and authentication server 106 software components/solutions (e.g., drivers, other applications or simply executable sets of code) described herein. Other solutions may be present in some environments and embodiments which are not specified here. Likewise, FIGS. 2A-2C are illustrative of discrete and functional locations of various system 100 components in an embodiment of system 100.

With reference again to FIG. 1, a process flow of embodiments of a data transfer and video frame serving system 100 may include the following broad steps or functions: initialization, frame data (e.g., image and sound data) generation and processing, user interface data (e.g., mouse inputs, key inputs, inputs from client front-end 102 side USB devices, etc.) generation and processing and cleanup. In embodiments, these steps or functions are not discrete. In embodiments, each of the steps or functions overlap to some extent. The following provides an exemplary description of each of these steps or functions, according to one or more embodiments of system 100.

Initialization

In embodiments, each of the three discrete software suites (client front-end 102, frame server 104 and authentication server 106) are initialized in a proper order relative to each other and follow the main process described here, related to each of the three parts.

Authentication Server 106 Initialization:

In embodiments, authentication master server of authentication server 106 is the first of the main software suites to be initialized. This software, once started, may perform the following tasks:

1) Read initial configuration settings to know in what mode to start;

2) Validates its own enterprise license;

3) Scan network base information to get a basic network topographical map and understanding of the type of environment in which authentication server 106 is present;

4) Connects to the frame server hardware manager and low level OS manger (may be the same) and receives information on the status of the hardware, what configuration system 100 is in (e.g., stand-alone servers, virtual OS systems, or hybrid systems environment);

5) Sends signals to hardware/OS manager to start server instances (if not already running);

6) Retrieves user authentication information and tables and bridges to LDAP type nodes if available or, if not available, starts internal stand-alone LDAP type system;

7) Starts services to listen for new frame server(s) 104 coming online;

8) Starts services to listen for new client front-end(s) 102 coming online;

1. In embodiments, authentication master server starts services for mobile and services for desktop clients, as separate but related data service suites;

9) Manages connection to frame server(s) 104 and stores status of frame server(s) 104 while managing license for each frame server(s). Manages authentication for frame server 104 user information (if any).

10) Manages connection to client front-end(s) 102 and stores status of client frontend(s) 102 while managing authentication of client front-end(s) 102 user; and 11) Manages encoding properties for frames and user interface as well as initial connections between client front-end(s) 102 and frame server(s) 104.

Frame Server 104 Initialization:

In embodiments, the frame server 105 initialization is fairly straight forward overall, and includes:

1. Kernel level operations, drivers and hooks start as soon as the OS comes online;

2. The front-end software of the frame server 104 start up and gather basic information about the host hardware system, such as GPU, driver versions, CPU, RAM, HDD-SSD, network topography, OS version, etc.;

3. The front-end of frame server 104 performs basic license check;

4. The version and initial configuration of the main data processing server of the frame server 104 are completed at this time, to ensure that proper version of frame server 104 instance is being run for the hardware detected or configured to be used;

5. The front-end of frame server 104 then starts up the back-end software and awaits notifications from the main data processing server and ads a watcher to ensure main data processing server health;

6. Main data processing server starts up and performs additional basic licensing checks.

7. The main data processing server gathers further details about the specific capabilities of the hardware related to the initial configuration, such as amount of available VRAM, etc., as well as the status of Kernel level hooks and determines which user interface replay modes and frame kits to use;

8. The main data processing server generates further security related and licensing related tasks;

9. The main data processing server now starts sub-processes (non-Kernel backend software sections, including the application side of the Kernel Interface drivers set) and informs the front-end of frame server 104 of its status and crystallographic methods being used;

10. The front-end of frame server 104 then gathers messages from the main data processing server and registers with the authentication server 106, retrieving verification of software versions and real time licensing begins;

11. The front-end of frame server 104 and the main data processing server now await further instructions and or connections from the authentication server 106 or client front-end 102 on their own discrete network processes (as well as each other via specified intercommunication pipelines and methods);

12. The main data processing server monitors the front-end software to ensure stability is within specified bounds and performance parameters. Main data processing server may take action on the front-end software to bring into specified bounds; and 13. The front-end of frame server 104 monitors the main data processing server software to ensure stability is within specified bounds and performance parameters. Front-end of frame server 104 may take action on the main data processing server to bring into specified bounds.

Client Front-End 102 Initialization:

This is the software seen on the end user device (end client 102 such as on their mobile phone or client side computer).

1. The front-end software of the client front-end 102 start up and gather basic information about the host hardware system, such as GPU, driver versions, CPU, RAM, HDD-SSD, network topography, OS version, etc.;

2. May perform optional licensing check here;

3. The front-end software of the client front-end 102 now awaits user log in information (user-name and password or smart card, etc.);

4. The front-end software of the client front-end 102 gathers the log in information and basic network topography and registers with the authentication server 106. The authentication server 106 responds with a list of nodes available for the user to access;

5. May perform optional licensing check here;

6. The front-end software of the client front-end 102 now awaits user selection of a frame server 104 node to which to connect;

7. Once selected, the front-end software of the client front-end 102 gathers further cryptographic information from the authentication server 106 and configures the main client software suite for initialization;

8. The front-end software of the client front-end 102 now starts the main client software suite;

9. May perform optional licensing check here;

10. The main client software suite loads passed initialization information and attempts to connect with the frame server 104 node and updates the front-end software of the client front-end 102 with status information;

11. The front-end software of the client front-end 102 updates the authentication server 106 with status information;

12. A direct network pipeline path from the main client software suite of the client front-end 102 to the main data processing server of the frame server 104 is now negotiated using the known cryptographic information. This may include the type and tolerance of the network path (such as, TCP, UDP portions, specific ports, etc.);

13. The front-end software and the main client software suite of the client frontend 102 now await further instructions and or connections from the authentication server 106 (as well as each other via specified intercommunication pipelines and methods);

14. The main client software suite monitors the front-end software to ensure stability is within specified bounds and performance parameters. Main client software suite may take action on the front-end software of the client front-end 102 to bring into specified bounds; and 15. The front-end software of the client front-end 102 monitors the main client software suite to ensure stability is within specified bounds and performance parameters. Front-end software may take action on the main client software suite to bring into specified bounds.

Frame Data (e.g., Image and Sound Data)
Frame Server 104—Image Data Generation and Processing:

With continuing reference to FIG. 1, frame data is generated by the frame server 104 video frame encoder sub-application set. The process performed by the video frame encoder may change slightly for various hardware and operating systems on which frame server 104 software is running. Although the following describes most of those differences from a high level, specific details and implementation may differ slightly from what is described herein.

For sake of discussion, all sub-applications and processes related to the "video frame encoder sub-application set" will be referred to herein as "VFE."

1) Main data processing server of frame server 104 starts the VFE;

2) The VFE starts processes and APIs and API overloads related to specific hardware and drivers found (e.g., Nvidia, AMD, CPU only, Driver #, GPU capabilities, MS Windows desktop graphics maps, etc.) for proper optimization. This means that the VFE finds the most optimal source for the root image data possible based on available hardware, OS, drivers, etc.;

This may include creating virtual desktops and cloned displays located in GPU memory to gain access to all required data in as low of level as possible. In embodiments, this is done mainly with driver APIs for specific detected hardware and driver versions;

3) The VFE registers memory and hooks into the CPU and GPU for its working space;

4) The VFE locates the lowest possible frame data, preferably the actual memory space on the GPU that is used for processing the raw image data, however this may be even as high as final OS CPU image sets if required by a specific instance;

5) The VFE then maps this image set and extends the memory allocation region to include a working set map (registered above) to allow direct manipulation of this image set data and access to modify it or copy it when possible. When not possible, VFE creates artificial bridges of data pipelines from the lowest possible source to the registered working set data location;

6) The goal of not copying any data when not required is to be stressed in all cases of image manipulation and referencing. The optimal cases are registered to minimize any data copying or redundant data manipulation on hardware, driver or OS levels;

7) At this time, the VFE creates any needed encoder paths. This may be either:
  a) Dedicated hardware encoder hardware (GPU registration through extended driver API for use of the encoder pipeline);
  b) Non-dedicated encoder hardware (GPU loaded custom encoder routines to emulate a dedicated hardware path); and,
  c) CPU or Software paths for encoding (worst case) and additional RAM locations for image data are registered;

8) Once an artificial bridge of a data pipeline (e.g., pipeline 110 or channels 108, 112 or 114) is established, a root image in real time is then manipulated such that the manipulation of the image data is in the bridged data set and the raw data set is in the lowest possible root location (or the actual root GPU source when possible). This is the pre-processing of the image data to prepare for encoding, such as filter data or merging data sets, evaluating differences between time intervals and mapping data types to new data sets required for sending;

9) The encoding process uses the mapped root image+bridged data set map and passes this memory location to the registered encoder path, overloading the API where possible to avoid copying any data and forcing as much work as possible to be done with the root image+bridged memory set as the source. This allows, under certain circumstances, for roughly 100% of all imaging processing to stay on the same section of the GPU without utilizing any CPU processes or non-inter-GPU processing. In other implementations, system 100 may 0.001% to less than 1% CPU load in typical CPUs. Approaching this performance is not possible in other existing streaming software methodologies which often use between 10% and 50% of the CPU in similar cases;

10) VFE then manages the encoder path to allow for specific functionality and real time optimization of the encoder path, to produce an image of required parameters (such as specified encoder parameters, quality, tolerance for deltas, etc.);

11) The VFE then takes the encoded image memory location and maps that location for the network card (while minimizing copying data from the GPU to the network card to between zero and two times depending on the specific solution);
   a) Note: typically, making zero copies is possible if in CPU mode or other non-optimized encoder methodologies and image data is already visible or mapped to the CPU. In optimal cases, one copy is made to present the data to either inter-mapped GPU memory or copied to RAM. In some implementations, the GPU memory may be mapped, allowing for zero copies to be made. However, this typically requires modified GPU hardware or other special cases to allow for this cache (the mapped GPU memory) to be shared;
   b) The image frame is processed through the encoding application set, allowing the frame itself, while it is being packed into a network packet, to be encoded in real time;
   c) During the process noted above, this memory location is visible to the CPU either through inter-mapped GPU memory (specific cases) or copied to RAM (normal operation) (or if network card maps this memory directly, as noted in 11a) above). This allows embodiments of frame server 104 to send this newly formed network packet directly with a low level network call, avoiding delays and passing the memory location directly to the outgoing network stack.
   d) This data packet includes header information noting some overhead which allows for overloading cryptographic parameters for decoding, other time relative data, etc. that may be needed for efficient decoding of the image data;
   e) Other cryptographic data is sent through the authentication server 106, via the frame server 104;
12) The VFE ensures that all of this is done in between frame generation on the GPU, allowing processes after (9) or (10) to occur concurrently when possible to 'next frame generation' increasing throughput and reducing latency; and
13) The VFE then during each step, ensures that data is locked or released when required (or that the data is shared properly via careful timing without the need for locks) to reduce impact and/or increase throughput while maintaining minimal integrity to the memory locations.

Frame Server 104—Audio (Sound) Data Generation and Processing:

With continuing reference to FIG. 1, sound data is processed in a similar fashion to above. However, audio data may use sound cards, OS, application level, Direct X level, etc. audio hooks to locate root audio. The audio frame is then processed on the CPU in most cases, and some, e.g., GPU or Sounds Card resources may be used if the hardware permits, similar to how the GPU resources are used in the image section. This is a much less intensive process compared to image data. In some cases, the GPU retains information about the system audio, in those cases we may hook into this data and incorporate it into the encoded frames directly without additional overhead. Overall, with this in mind, please reference the above Image Data section for an overview of this process.

Authentication Server 106—Frame Data Processing:

The authentication server 106 during run time maintains notifications related to encoder information and notifies the other end of the path any required cryptographic or encoder setting changes to support a wanted mode (either by detection of performance, or by selection of the user, cases specific—e.g., loss-less mode was entered, or 'super secure' mode was exited back to 'normal mode'); The authentication server 106 does not handle the data stream as an intermediate, to improve performance.

End Client 102—Frame Data Processing:

With continuing reference to FIG. 1, the frame decoding and displaying of the video/audio stream generated and sent by frame server 104 is completed by the client front-end 102. In embodiments implemented by system 100, the decoding and displaying process is simple when compared to the encoding process, and is not too different from playing any audio/video data stream, with an included encryption-decryption process.

1) The main client of client front-end 102 determines what, if any, hardware decoders exist that can handle the required frame data (some hardware decoders may not be used, others may be overloaded, others may be used natively with the required API, etc. The determination of each of these issues is made here by main client).

2) The main client then starts the video frame decoder and audio decoder (together, video and audio frame decoding suite of sub-applications and processes (referred to herein as "VAFD")).

3) The VAFD registers a set of required memory based on the specifications of the frame stream (size, quality, etc.) [in embodiments, specifications are determined and notified during the network initialization step] which is done during initial maps and hooks for the decoding of the incoming frame data. May be done thorough the noted found and related API in most cases (such as Android low level API or Android high level API depending on the detected hardware and OS version or selected playback method) or through modified, overloaded open source playback methods;

4) The VAFD is passed the incoming frame data from the main client. In embodiments, VAFD decrypts the incoming frame data using negotiated decryption routines;

5) The VAFD then sends this decrypted frame data to the registered decoder path, from step (3) above;

6) The VAFD then receives this decoded data returned as a memory address and displays this to the screen using a play-back routine, e.g., client front-end 102 proprietary back-end playback method, basic existing playback methods (e.g., standard graphical APIs such as DirectX, OpenGL, intel decode-to-play, etc., standard implementations), utilizing overloaded OS related APIs or modified, overloaded open-source methods (such as display to screen image functions in Android). Client front-end 102 back-end playback method may be implemented similarly to the encoding generation (e.g., similar in function, with different targets and reversed direction of data flow). Back-end playback method may be a dynamic method for playback, utilizing different decryption, decoding, image-audio preparation and playback methods that are optimized for the target (i.e., the client-front end 102) environment. As such, back-end playback method may utilize Android low level or high level decoding and use the client GPU for decryption or use dedicated decoding hardware that may exist to run the decode-to-usable image/audio frame instance). Back-end playback method may be modified and balanced for the environment and use various playback options, for example, DirectX operations to draw to the screen, OpenGL, Android frame-draw methods, or other methods which would be optimal on the client system that is being used;

User Interface Data Generation and Processing

With continuing reference to FIG. 1, client front-end 102 gathers client front-end 102 user interface controls include items such as: keyboard keys pressed, mouse data, touch screen commands, client front-end 102 side USB data, security key data and interface, joystick data, microphone data, other data sent from client, etc. After gathering, client front-end 102 may optionally encrypt user interface data and send directly to the frame server 104 using the initiated network pipelines and cryptographic processes negotiated (e.g., both before-hand and in real time).

This user interface data is received by the frame server 104, and decoded if needed, then transferred to "user input replay section" (herein referenced to as "UIR") of user command decoding software of frame server 104. Authentication server 106 may act as a manager for negotiated cryptographic services used for this process.

Detailed Process (Excluding Encryption Negotiation):

1) The client front-end 102 creates low level hooks into USB/related peripheral objects and all mouse, keyboard, touch screen, etc. objects and creates a virtual object in required cases of the related type (such as a virtual joystick on Android devices);

2) The client front-end 102 captures this data and creates a virtual map for all possible data sets or encapsulates unique data sets (such as USB security keys) to prepare for encrypting this data;

3) The client front-end 102 encodes this data to prepare for sending and creates network packets. In embodiments, is not required and may be changed in real time to map to real time changing conditions;

4) The client front-end 102 schedules the outgoing packets, using the network pipes generated during the initialization process to send to the frame server 104 node to which client front-end 102 is connected;

5) The frame server 104 receives the data packet with the user interface information contained in it;

6) The frame server 104 decrypts this received data;

7) The frame server 104 passes this data to the UIR of client front-end 102 for processing;

8) The UIR determines the data type (such as key press, or mouse motion, etc.); and 9) The UIR then forwards this action request to the proper playback methodologies:
   1. If Kernel mode is available on the specified request (such as frame server 104 back-end software kernel mode mouse drivers) then this command is sent to the initialized frame server 104 back-end software kernel mode driver, via means of the backend software kernel interface; and
   2. If kernel mode options are not available then a specified OS replay is used, using the OS API for replay of the specified function.

Cleanup
Authentication Server 106

With continuing reference to FIG. 1, in embodiments, the authentication server 106, when closed, allows the frame server(s) 104 and client front-end(s) 102 existing in running state to continue to run for a time specified by the license scenario to be configured in the specific environment (from seconds to years is possible, typically in the several minutes to a couple of hour state). Once this time has passed, the run time licensing is no longer valid and the frame server(s) 104 and client front-end(s) 102 will close due to license expiring. In embodiments, new sessions are not possible during this time, until the authentication server 106 is brought back on line. Note that, in embodiments, the authentication server 106 is a set of systems, therefore, so long as a single non-overloaded authentication server 106 node exists there will be no impact to the frame server(s) 104 and client front-end(s) 102. This allows for maintenance of real-time facing servers with minimizing impact.

Frame Server 104

When a frame server 104 exits, the frame server 104 notifies the authentication server 106 of a new free node to allow the exiting frame server 104 to be placed in a new waiting state either for the same user or for the general pool (pausing OS execution), depending on the environment. The frame server 104 then restarts itself and all sub-processes and sub-applications ensuring that they are all in a clean state. A connected client front-end 102 detects this closure and disconnects from the frame server 104 closing all sub-processes and then requests an updated list of available frame server 104 nodes to which to connect. This may be the same session saved in the frame servers 104 to be loaded into other nodes or other different nodes available to the user depending on the environment.

Client Front-End 102

When a client front-end 102 exits, the client front-end 102 notifies the authentication server 106 of the end of resource utilization and the frame server 104 to which the client front-end 102 was connected is then recycled into the general pool or user specific pool reducing resource overhead, freeing resources. The frame server 104 restarts awaiting further processing and communication, once the high level OS is running (or at once if it is still running). The client front-end 102 then releases all subresources and processes cleaning up client side memory and resources. The authentication server 106 notes the disconnect of the client front-end 102 and releases the user's processes to the minimal specified by the environment.

Figure 3:
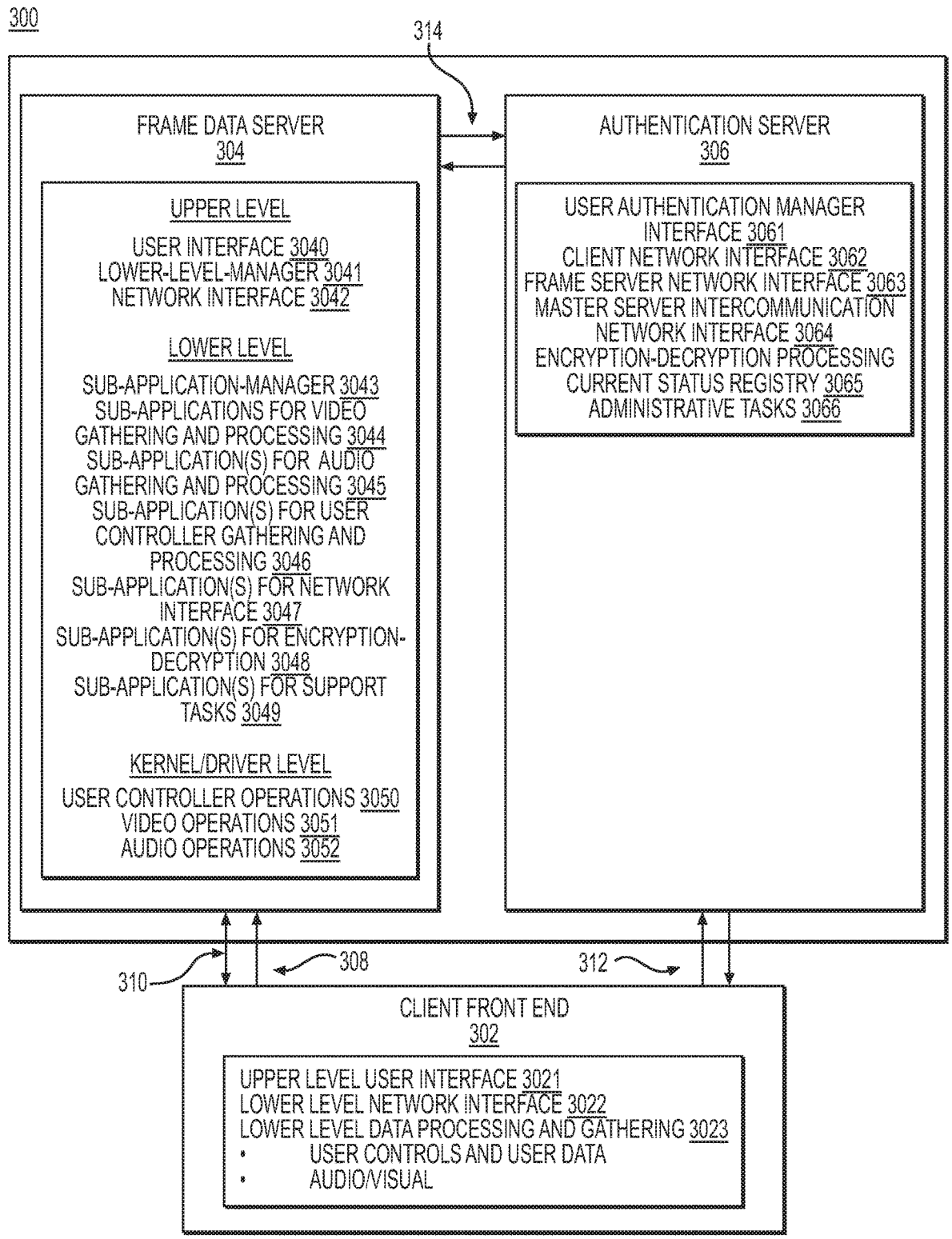
FIG. 3 is a diagram logical illustrating data transfer and video frame serving system, according to one or more embodiments.

With reference now to FIG. 3, shown is an embodiment of data transfer and video frame serving system 300. As with data transfer and video frame serving system 100 illustrated in FIG. 1 and discussed above, data transfer and video frame serving system 300 includes client front-end or end-client 302, frame or client server 304 and authentication or main server 306. As above, the frame server 304 is the primary software running on the primary computer with which the client front end 302 communicates. The frame server 304 provides video frame data and other data, to be sent and/or streamed to the client front end 302. The video frame data and other data served by the frame server 304 may include video frame data (corresponding to video frames and/or portions thereof), audio data, and other data from the software.

In the embodiment shown, frame server 304 and authentication server 306 are software hosted and/or run on the same server hardware. The hardware on which frame server 304 and authentication server 306 run may be, for example, one or more servers, as described above. With continuing reference to FIG. 3, system 300 may be configured and operate similarly to system 100 and as described. For example, one of skill in the art will readily appreciate that other embodiments of the frame server system 300 may include numerous client front ends 302, frame servers 304, and/or authentication servers 306. Similarly, client front end 302, frame server 304, and authentication server 306 may be communicably coupled to each other via a first communication channel 308, a second communication channel 312, and a third communication channel 314. Upon a successful connection with the frame server 304, a video frame pipe or data stream 310 is established there between which transfers a substantial majority of the data. The third communication channel 314 can be used to register the frame server 304 with the authentication server 306, and for the authentication server 306 to send licenses to the frame server 304. In one embodiment, one or more of the first, second, and/or third communication channel, 308, 312, and 314, accordingly, can be implemented using the RSA encryption method as known to those skilled in the art.

With continuing reference to FIG. 3, the following provides additional detailed description of logical sections, sub-applications, dynamic link libraries (DLLs), low-level drivers and other components, features and functions of an embodiment of data transfer and video frame serving system 300. In embodiments, the logical sections of data transfer and video frame serving system software 300 often include multiple subapplications or threads, such as separate DLL sets, sets of execution code, or drivers that are running. The following provides a logical listing of components, features and functions of an embodiment of data transfer and video frame serving system software 300.

Software Logical Parts
I. Frame Server 304
  1. Upper Level User Interface 3040
  2. Upper Level Lower-Level-Manager 3041
  3. Upper Level Network Interface 3042
  4. Lower Level Sub-Application-Manager 3043
  5. Lower Level Sub-Applications for Video Gathering and Processing 3044
  6. Lower Level Sub-Application(s) for Audio Gathering and Processing 3045
  7. Lower Level Sub-Application(s) for User Controller Gathering and Processing 3046
  8. Lower Level Sub-Application(s) for Network Interface 3047
  9. Lower Level Sub-Application(s) for Encryption-Decryption 3048
  10. Lower Level Sub-Application(s) for Support Tasks 3049
  11. Kernel/Driver Level User Controller Operations 3050
  12. Kernel/Driver Level Video Operations 3051
  13. Kernel/Driver Level Audio Operations 3052 (collectively, 11-13 Kernel/Driver Level Hooks)
II. Mobile Client Front-End (Android/IPhone/etc.) 302 and Non-Mobile Client Front-End (PC/Linux/etc.) 302
  1. Upper Level User Interface 3020
  2. Lower Level Network Interface 3021
  3. Lower Level Data Processing and Gathering 3022 User Controls and User Data Audio/Visual
III. Master Authentication Server 306
  1. User Authentication Manager Interface 3060
  2. Client Network Interface 3061
  3. Frame Server Network Interface 3062
  4. Master Server Intercommunication Network Interface 3063
  5. Encryption-Decryption Processing 3064
  6. Current Status Registry 3065
  7. Administrative Tasks 3066

Frame Server 306

The front end of the frame server 304 starts up and gather basic information about the host computer and operating system, such as GPU, driver versions, CPU, RAM, HDD-SSD, network topography, OS version, etc. Frame server 304 front end performs this primarily via standard OS calls; however, frame server 304 may be passed some "global" status information that the OS does not have (such as "Hardware-Server-Frame" data) provided by the master authentication server 306 after connection to the master authentication server 306.

Front end of the frame server 304 determines the base status of the host computer system and reads any base initial configuration items (e.g., such as the location of the master authentication server(s) 306, if in Demo or Retail mode, etc.). Frame server 104 performs basic license checks and log-in via connection to either a master authentication server 306 available in a pool of master authentication servers 306 or via "Demo/Stand Alone type" license checks depending on the environment. A version and initial configuration of the frame server 304 are completed at this time, to ensure that system 300 is running a proper version of frame server 304 instance for the hardware detected or configured to be used.

Upper Level User Interface 3040

With continuing reference to FIG. 3, this is a simple user interface which may be changed (modular) to fit environmental needs. Upper level user interface 3040 is a basic interface that the user will see and which calls other sub-applications, DLLs, etc. for all functionality. In embodiments, upper level user interface 3040 is a GUI.

Upper Level Lower-Level-Manager 3041

The upper level lower-level-manager application 3041 may perform the following tasks:
  1) Ensure that the frame server 304 lower-level software is running. If upper level lower-level-manager 3041 detects an error (e.g., a crash, shared memory pipes not having proper responses, network conditions in error, etc.), then upper level lower-level-manager 3041 will close and restart the lower-level software;
  2) Upper level lower-level-manager 3041 also takes any configuration received from the master authentication server 306 and applies the configuration to the lower-level processes' configuration (e.g., such as requirement that the lower level processes should capture monitor 1, and not monitor 2, etc.);
  3) Sends status of the hardware system and software 300 to the master authentication server 306;
  4) Accept system level commands from the master authentication server 306 (e.g., such as reboot the server or get a new software patch, etc.). Embodiments of upper level lower-level-manager 3041 does this by standard OS calls in C++/C #/Java using OS SDKs;
  5) Launch any related software, such as a video game if the user will request to stream a video game. Upper level lower-level-manager 3041 may also position that game on the proper location and monitor the game to ensure that it is running without hanging etc. Upper level lower-level-manager 3041 may do this by standard OS calls in C++/C #/Java using OS SDKs; and
  6) Ensure license to data transfer and video frame serving system software 300 is proper. In embodiments, this may be done via a reverse RSA method.

Upper Level Network Interface 3042

With continuing reference to FIG. 3, the upper level network interface application 3042 works to ensure proper communication to the master authentication server 306, e.g., via, e.g., third communications channel 314. Upper level network interface 3042 may starts up a Windows Presentation Foundation (WPF), TCP, UDP, HTML, HTML5 or other type client that matches the required environmental settings. In embodiments, WPF clients are preferred. On some systems such as Linux systems, however, WPF may not be viable. These are all fairly standard server—clients.

In embodiments, upon connection to the authentication server 306, a single session encryption protocol is negotiated both for the communication pipeline itself (such as in WPF utilizing either session or transmission bases encryption) as well as a session based RSA key share so that the authentication server 306 and the frame server 304 may encrypt all information sent back and forth (e.g., configuration, user name, passwords, etc.). These RSA keys may be maintained for the lifetime of the network connection for this instance of the software.

Once the key share occurs, status updates and configuration items are requested from the authentication server 306 and system status is sent to the authentication server 306 for recording.

A data pipe (e.g., channel 314) from the frame server 304 to the authentication server 306 (and from client front-end 302 to the authentication server 306 (e.g., channel 312)) is also set up to allow data to be pulled and pushed, bi-directionally from and to the authentication server 306 (and from and to client front-end 302 through authentication server 306). Such data may originate from the authentication server 306, from frame server 304 (to be sent to client front-end 302) and from client front-end 302. Such data pulled and pushed over these pipes may include data related to encryption options, current encryption to be used 'now,' run-time options, server status, administrative overhead (e.g., user log in routines, system control options such as patching and rebooting, system utilization, etc.), alternate pathways for some operations, such as sending documents from the frame server 304 to a client front-end 302 printer, alternate methods for other secure data transmissions of secondary data such as USB data or copying files between the frame server 304 and the client front-end 302 in a highly controllable highly secure less latency sensitive methodology or when the data integrity is more important than the timing of the data (e.g., it is more important that the entire document was sent to the printer than that it took one (1) second longer versus situation in which it is more important that the next image frame gets received/sent 'now' than that there is one (1) missing frame of image data). This alternate pathway allows for these checks to be in place in a way that does not get in the way of the core operations—lower speed, higher reliability, higher security possible, and can send data to the authentication server directly for administrative use. When speed is less crucial, such data may be sent to client front-end 302 in a low level operation such as USB pass-through, by tying the front end of the frame server 304 directly to the front end of the client front-end 302 to bypass the authentication server 306 for the actual data sent (e.g., data for a document to be printed by the client's printer when saving network delay and saving authentication server 306 work). In embodiments, the frame server 304 and client front-end 302 have similar upper level network interfaces.

Lower Level Sub-Application-Manager 3043

With continuing reference to FIG. 3, the lower level sub-application-manager application 3043 is a lower level application set (which starts with the launching of the frame server) that manages all core non-kernel level applications, DLLs, etc. Upon launch, the lower level sub-application-manager 3043 may verify the license. Lower level sub-application-manager 3043 may then determines basic information such as asking the OS what GPU (if any) is available as well as what OS frame server 304 is running on, etc., to ensure that the proper version of the data transfer and video frame serving system software 300 application was launched. If the proper version was not launched, lower level sub-application-manager 3043 notifies the upper level manager 3041 of an issue.

Lower level sub-application-manager 3043 may start-up/launch other subapplications (e.g., Lower Level Sub-Application(s) for Video Gathering and Processing 3044, Lower Level Sub-Application(s) for Audio Gathering and Processing 3045, Lower Level Sub-Application(s) for User Controller Gathering and Processing 3046, Lower Level Sub-Application(s) for Network Interface 3047, Lower Level Sub-Application(s) for Encryption-Decryption 3048, Lower Level Sub-Application(s) for Support Tasks 3049, and Kernel/Driver Level Hooks 3050-3052). Lower level sub-application-manager 3043 may also monitor the health of the other sub-applications and, if any issue is noticed or any odd behavior beyond a threshold (e.g., reporting responses across shared memory come back in error or not in time, etc.) with any sub-application, may close the affected sub-application to allow the upper level manager 3041 to resolve the issue and restart the affected sub-application.

Lower Level Sub-Application for Video Gathering and Processing 3044

With continuing reference to FIG. 3, the following section provides a detailed description of an embodiment of a system and method for video gathering and processing. As described herein, one or more embodiments are implemented as a sub-application of frame server 304, specifically a lower level sub-application for video gathering and processing 3044. The following description includes the following sub-sections:

Logic overview
Tables and Summary
    Raw Graphics Sources
    Encryption Sources Logic Overview:

According to one or more embodiments, the video gathering and processing subapplication 3044 is a global wrapper that contains many capture and encoding modules which are loaded only when on a specific environment. In other words, in embodiments, only the capture and encoding modules applicable to that environment are launched and run. This construction of the video gathering and processing sub-application 3044 allows specific modules to be built for numerous specified target or detected hardware/software environmental conditions (e.g., current retail AMD cards, older server AMD cards, specific types of Nvidia cards, CPU only, modern Intel CPUs with enhanced capabilities, etc.), enabling the video gathering and processing sub-application 3044, and hence the frame server 304, to operate on and support numerous graphic hardware configurations. These characteristics of the video gathering and processing sub-application 3044 also enable code of the video gathering and processing sub-application to be very specific for and specifically written to maximize the efficiency of the given environment, e.g., specifically written for the use of Nvidia native-only code, or even specific card dependent code even more specific then general Nvidia cards, avoiding the use of general code unless an outlier environment is required. These features, therefore, enable video gathering and processing sub-application 3044, and hence the frame server 304, to reduce operational overhead in both memory, compute power required and execution time. These features also make it easier to diagnose issues as the software may be debugged for a specific target environment or card without effecting any other environment in the code base.

With continuing reference to FIG. 3, an initial module of the video gathering and processing sub-application 3044 is initialized with timing information. The initialized module detects the GPU and CPU or other computation resources available for encoding and capture. The appropriate module may be initialized based on a options read from a configuration of modules (e.g., read from configuration files, including pre-defined files and/or files transferred at initialization of system spin up by the authentication server 306) and dynamic options based on user selection of options available via the configuration. Once a configuration selection has been made (e.g., such as use AMD on-board card for encoding), then the video gathering and processing sub-application 3044 module detects the graphic card type and loads information related to that card and the environment based on a second set of configuration files (e.g., including pre-defined files and/or files transferred at initialization of system spin up by the authentication server 306). The video gathering and processing sub-application 3044 module then detects environment and, based upon configuration limitations (e.g., such as only use AMD card for main graphics requests even detecting an Nvidia card, etc.), then detects the total set of resources available (e.g., the specific set of GPUs and CPUs, etc. that can be detected) and begins the following operations:

Initialize a note of the client front end 302 connection to ensure that the graphics pipe(s) is integrated with the client front end 302 network pipe(s).

Initialize a memory reservation for expected work on the detected resources (for example, reserve a memory block on the, e.g., AMD GPU). Note, this note may be interchanged with/replaced by the following action depending on the case.

Initialize any environmental graphics initialization required (for example, if a modern Radeon card is detected, then load the reservations and instantiations for the hardware virtual graphics interface). Note, this note may be interchanged with/replaced by the preceding action depending on the case.

If using a virtual graphics interface, then initiate source memory objects (where the video frame is coming from, such as a request that the GPU make available the memory pointer for where it stores its readable copy of raw graphics data that will be sent to the monitor and the OS or the OS's memory pointer to where it stores a readable copy of the graphics data the OS is using).

Attempt to negotiate the source memory objects data to be writeable if possible (in some GPUs it is possible to insert memory into this space to save time or to 'clone as written' this location such that video gathering and processing sub-application 3044 gets a source of the memory that is written as a cloned or mapped memory object that video gathering and processing sub-application 3044 can write to without needing to truly copy the memory). In embodiments, video gathering and processing sub-application 3044 may achieve this by converting the raw memory block into a fixed map-able region so that the memory is extended and video gathering and processing sub-application 3044 can perform operations from this data set and store data into the extension. Alternatively, if the data is already in a writable safe location, such as OS presented data in Windows 8.1+, then video gathering and processing sub-application 3044 can write to that location using the minimal required graphical mappings (which are initialized at this time).

In addition, if the source memory objects can maintain audio data (e.g., as is the case with some AMD systems), video gathering and processing sub-application 3044 module forwards a pointer of the memory location to audio code running in another sub-application of frame server 304.

Note that the above may be initialized in either a single thread or a collection of threads, depending on what configuration and hardware is available. For example, in some cases establishing a pipeline to capture the graphics data and sift the graphics data to a usable area takes about the same operational time as the remainder of the modifications to the graphics data (e.g., encoding, balancing, cropping, etc.). Consequently, video gathering and processing sub-application 3044 module may set up multiple manipulation threads or even multiple capture threads that feed into a pool and maintain order notes to save operational time.

In other cases, to reduce overhead or in some cases where the raw graphics are already in a state where video gathering and processing sub-application 3044 can manipulate the raw graphics directly or relatively directly then embodiments may use a single thread to eliminate overhead and delays with keeping track of multiple operations between threads (i.e., merging data between multiple threads and locking and unlocking memory all take some small time and this can in some cases be worse than simply running all further capture and modification sections in the same thread).

In embodiments of frame server 304, there are several special cases, such as for some Nvidia cards, for which video gathering and processing sub-application 3044 can load some GPU run-able code as a separate thread on the graphics card that has access to the same memory locations. This enables video gathering and processing sub-application 3044 to maintain two memory locations into and from which graphics data is captured, have graphics data modification step executed on this other thread, modify the memory directly then pass the modified graphics data onto the remainder of an originating thread. By doing this, embodiments of video gathering and processing sub-application 3044 of frame server 304 intentionally run well-timed 'thread unsafe' operations to save overhead and time. These are risky operations and must be utilized only in special cases.

However, utilizing such operations can, at times, increase FPS by a percentage points.

With continuing reference to FIG. 3, after all of the initialization and instantiation noted above, video gathering and processing sub-application 3044 may start a process that does the following on a per frame basis: get current timing information, current encoding and-or encryption points (i.e., timing, ordering and which encryption to use information), generate a new memory location (as opposed to an old one, as this is faster) for audio video packets (this lets the memory clearing occur and pointer safe removal occur while the new memory registration is occurring which is faster than the typical approach of reusing this audio video memory location), receive some graphics capture object (or in the case of some hardware and drivers being available, video gathering and processing sub-application 3044 may get an encoded frame at the same time), and then calls the hardware (if available) or emulated (e.g., image modification, encoding and encrypting) operations which may be either:

1) A operational call set (may be a single call of one or more types or multiple calls of one or more types) from a driver hook (driver hook may be released by the hardware company (e.g., AMD) or may be a low level hook written to interact with the hardware directly as a low level driver, driver part, or driver extension when the provided or available manufacture drivers do not support the operation required) requesting a region of frame memory to be returned as an encoded and prepared section based on initialization above, providing video gathering and processing sub-application 3044 with either:

A) A readable memory location that can be copied from for further use; or

B) A readable/writable memory location on which video gathering and processing sub-application 3044 can perform any further operations directly.

Note that in some cases, audio may be gained from a feed at this point. Some GPU encoders already have a copy of the related audio in a memory section related to the image section. If that is the case, the related audio is directed by video gathering and processing sub-application 3044 to the audio portion of the network data section noted below (see Audio Gathering and Processing for more information) and completed at the same time to save time and resources on the system. This requires specific hardware and drivers to exist on the host hardware system. If such hardware and drivers exist, the audio data is treated as an extension of the image data below and does not go through the normal audio pipeline noted below.

2) An operational call set from a driver hook requesting a region of frame memory (graphics data) to be returned as a raw graphics data (e.g., such as raw GPU memory or raw or minimally processed graphics object data/maps such as a Direct X object or texture, though may be also just a memory block with image data in it, etc. depending on the available source). Then video gathering and processing sub-application 3044 passes this raw graphics data to either:

A) A hardware operation (meaning non-generic operation that makes use of hardware features, such as a hardware encoder, that may exist on the GPU or CPU, or other hardware), or B) A software (meaning that a hardware feature, such as a hardware encoder, is not available so use operations that use the 'normal-use' GPU or CPU, etc. resources as opposed to a specific purpose-built hardware solution) encoder/graphics data modification thread(s)/encryption thread(s).

Whichever option (A or B above) is used, an image modification section (either in the same thread or in another thread depending on the configuration/environment) is run, which thread will modify the raw image data (such as color balancing, size rescaling, etc.).

This modification section is not used in all cases—e.g., if raw data does not need to be modified. The raw or modified data is then passed to the (A or B type) encoding section to encode the image data. The encoded data is now stored in a network type data set (e.g., a data set that can be used inside an encapsulated packet set to send out). The network type data set is then passed to the (A or B type) encryption section, to encrypt the data inside the network type data set.

With continuing reference to FIG. 3, as the image data is already packaged into a network-recognizable structure as part of the operations in initialization, and I and II above, video gathering and processing sub-application 3044 can now forward this encrypted network type data set to some network handling situation (see, e.g., network sections of the frame server 304 software suite. See below.) Once the frame server 304 network section has had enough time to access the data, it is overwritten, either for garbage collection, with cleared data or with new data depending on the root object type used. This loop continues until all user connections or recording connections (as frame server 304 may be configured to record to a data file either locally or on another system without or with a user) which is determined by either a flag that a user has disconnected (i.e., a client front-end 302 has disconnected) and that the flag to record to a file either locally or to another system or data repository (such as FTP) is either completed or not active.

Raw Graphics Sources:

The following table, Table 1, provides a list of graphic sources supported by embodiments of data transfer and video frame serving system 300. No other known system for video gathering and processing supports more than one or two of these sources. This enables embodiments of data transfer and video frame serving system 300 to run at high efficiency across multiple hardware environments. Other known systems cannot do this.

TABLE 1

| Source | Notes |
|---|---|
| GDI | Old style graphics layer. This is the 'final' layer interface that the OS has. Pros: Always works. Cons: Very, very slow. |
| DirectX Buffer | This is fairly fast and good at capturing the entire screen or screen sections in very modern systems. It is also good at capturing images of running applications that use DirectX buffers. In DirectX 12 there is a new option to map the entire system graphics being processed and accessing it directly however the methods of hooks using Direct X Sep. 10, 2011 still work though are slower. |
| OpenGL | Better than DirectX in some application captures and in Linux in some cases. Useful when DirectX is not an option or is too slow, such as in OpenGL games. |
| AMD (Radeon style) Graphics hook | AMD hardware provides some accessible memory locations and routines which can be used to get a copy of the current screen region (or sub region). This is the copy of memory on the GPU as it is being processed to get it the same time the OS/Monitor would. There are two major sources here, a general hook into 'current' image being processed for a game or OS desktop or a "Virtual Desktop" mode which creates a duplicate graphics desktop. |
| AMD DOPP/Rapidfire | AMD produced a driver and hardware set which created a duplicate source image pipe that was accessible. This was called DOPP. |
| Nvidia Graphics hook | Nvidia has some support to hook into the base image data on the GPU using their SKD however it is more limited and often slower than just using DXGI. |
| DXGI Desktop duplication | Usable with most windows and some Linux systems. Fairly fast and good quality. Works better for desktop or screen captures then DirectX pre 12 overall. However, on capture speed and impact can be easily compared to the DirectX cases and OpenGL cases on a case by case basis. |

TABLE 1-continued

| Source | Notes |
| --- | --- |
| DirectX/OpenGL-type Hook | May employ a graphics hook into either a screen region or an application(s) using hook or duplication or reference methods that exist in graphics packages such as Direct X and OpenGL which allow for methods of interacting with graphics that are being created or generated or modified by some source application or OS layer. May be used in some cases if access to the graphics source directly (either on OS layer or GPU layer). |
| Intel FEI/QSV with Intel Media SDK Screen Capture | Intel in its latest release now also supports some graphics source capture hooks, which are incorporated into embodiment as a source option. |

Encoding Sources:

The following table, Table 2, provides a list of graphic encoding sources supported by embodiments of data transfer and video frame serving system 300.

TABLE 2

| Source | Notes |
| --- | --- |
| Software Option | This is a brute force encoding routine using known standard published functions on encoding. Pros: Always works. Cons: Very slow. |
| AMD (Radeon style) Encoder [AMD's Video Encoding Engine (VCE) suite] | AMD hardware provides some accessible Encoder routines that you can use. These may be fed either a direct memory location if the memory location is a "safe" memory location on the GPU (such as from DOPP or the Virtual Display) or a memory location of an image data set that is formatted in the proper input style. Embodiments optimize the source to encoder input conversion using the same memory location when possible and ensuring that the conversion is as fast as possible using proper implementation of image conversion mathematical functions in native or other GPU operable code. This also allows some hooks into audio data which embodiments can receive if initialized properly at the same time, accordingly allowing embodiments to turn the other audio feed off. |
| AMD DOPP/Rapidfire [AMD's Video Encoding Engine (VCE) suite] | Differing slightly from the above, this is an alternate encoding hook option for use with DOPP generated data sets. This can take the raw DOPP input source and on that same memory location operate the encoding allowing very fast and low overhead operation. This also allows some hooks into audio data which embodiments can receive if initialized properly at the same time, accordingly allowing embodiments to turn the other audio feed off. |
| NVEnc | Nvidia has a published encoder "NVEnc" which is widely used in the various encoding industries. Embodiments use it in some cases as it is the "best" option if can get a source image data that can be quickly converted or already is in the proper format for this to take in. Embodiments optimize the source to encoder input conversion using the same memory location when possible and ensuring that the conversion is as fast as possible using proper implementation of image conversion mathematical functions in native or other GPU operable code. |
| Microsoft Media Foundation (or other Microsoft Encoder) | Microsoft makes available some encoders in its Media Foundation suite as well as some recommended implementations for "direct*" [in reference to Microsoft DirectX/etc.] encoders. These are not overly fast however are 'good enough' if nothing else will work. There are multiple encoder interfaces, as seen in Microsoft documentation. |
| Intel FEI/QSV | Intel in its latest release now also supports some hardware encoding options with some chips which we are integrating. This is a good option in cases where either there is a lack of Nvidia or AMD GPUs or the GPUs are under stressed load or otherwise too slow and the Intel encoder is available. |

No known system for video gathering and processing supports or uses all of the above encoding sources. Likewise, no known system for video gathering and processing is built and optimized, as embodiments of video gathering and processing sub-application 3044 herein, based on an analysis for each of the above encoding sources of:

1) Support of various encoding features at all (e.g., done by gathering driver versions, hardware availability, OS running, etc.).
2) Time it takes to get a region or screen capture.
3) Resources it takes to grab the next frame.
4) Time it takes to convert the received image data to a given encoder.
5) Resources it takes to convert the received image data to a given encoder.
6) Determination of if it is possible to leave the gathered image in a memory location and feed it to the encoder without copying data.
7) Time it takes for the encoder to produce a resulting frame of data.

Embodiments of video gathering and processing sub-application 3044 also optimize based on known environment so that the optimal set of encoding sources and features thereof are run during run time. Likewise, known system's overall pipelines for conversion of image data to encoder input are not optimized well as such pipelines copy image data. Embodiments of video gathering and processing sub-application 3044 described herein target a multi-mapped memory location, where possible, which avoids copying image data and greatly speeds up operation. Moreover, known systems do not map this data into network type packet data structures as embodiments described herein. In embodiments described herein the memory in which an encoded frame is written is already suitable for use in generating network packets, avoiding the need to make copies of the frame data, thereby speeding up the process and reducing overhead.

Figure 4:
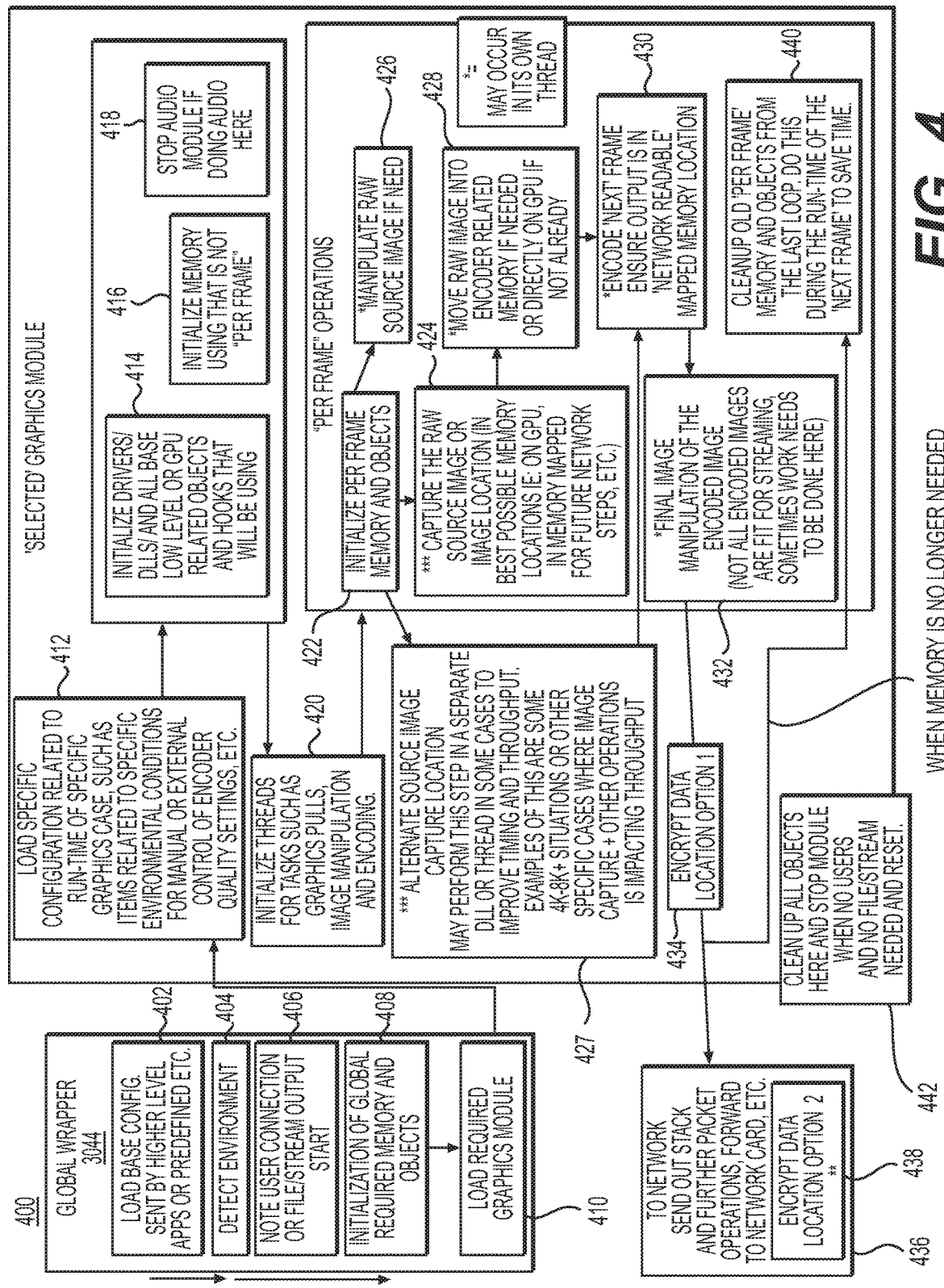
FIG. 4 is a flowchart illustrating an embodiment of a method for video gathering and processing that may be implemented by embodiments of data transfer and video frame serving system and method described herein.

With reference now to FIG. 4, shown is an embodiment of a method of video gathering and processing 400. Method 400 may be implemented by frame server 304 and video gathering and processing sub-application 3044. As shown, video gathering and processing sub-application 3044 (labeled global wrapper) may load a base configuration, block 402, which may be sent by higher level sub-applications of frame server 304 (e.g., lower level sub-application-manager 3043 or upper level manager 3041) or be a predefined base configuration, as described herein. Video gathering and processing subapplication 3044 than detects the environment in which video frames will be generated and displayed, block 404, as discussed herein. A user connection (e.g., connection from client front-end 302 via first communication channel 308) or file/data stream output start is noted, block 406. Video gathering and processing sub-application 3044 initializes required global memory and data objects, block 408. Based on the loaded base configuration and the detected environment, video gathering and processing sub-application 3044 may load the required graphics module of video gathering and processing sub-application 3044, block 410.

The loaded graphics module loads a specific configuration related to run-time of a specific graphics case, block 412. The loaded configuration may include, e.g., items related to specific environmental conditions for manual or external control of encoder quality settings, etc. Drivers, DLLs, and all base low level or GPU-related memory objects and hooks that will be used by the loaded graphics modules are initialized, block 414. All memory that will be used for non "per-frame" operations (see below) may be initialized, block 416. If the source memory objects can maintain audio data, as described above, the loaded graphics module may stop the audio gathering and processing subapplication/module 3045, block 418.

With continued reference to FIG. 4, loaded graphics module of video gathering and processing sub-application 3044 initializes threads for tasks such as graphics pulls, image manipulation and encoding, block 420. For per frame operations, loaded graphics module may initialize per frame memory and data objects, block 422. Loaded graphics module may capture raw source image or image location for the video frames, block 424. Raw source image or image location is preferably captured 424 in the best possible memory location, e.g., on GPU, in memory mapped for future network steps, etc. The raw source image may be manipulated if needed, block 426. As shown, the manipulation 426 may occur as part of the graphics module thread or in its own, separate thread and the result of the manipulation 426 merged with the graphics module thread. The raw source image, manipulated 426 if needed, is moved into memory related to the encoder being used or directly onto GPU if not already there, block 428. Moving 428 the raw source image may also occur in its own thread and the result merged with the graphics module thread.

As shown in FIG. 4, the graphics module may perform an alternative source image capture, block 429. The alternative source image capture 429 obtains the source image from an alternative location (e.g., directly from GPU low level memory) and may be performed in a separate DLL or thread in some cases to improve timing and throughput. Some examples in which alternative source image capture 429 is used include some 4$k$-8$k$+situations or other specific cases where image capture plus other operations are impacting throughput. Other examples include alternative source image capture 429: obtaining from the GPU low level memory directly when the GPU is generating a raw image for sending to the OS and/or to the monitor/display region/application draw region; obtaining an image that the OS (or application which exists in OS space) sees as its desktop environment from OS memory via requesting access to that memory or a copy of that memory from the OS; obtaining from a graphics driver that has a pointer to a GPU or CPU copy of the source image data; obtaining from an alternate device that exists after the traditional GPU has the image data (such as a device on the back of the GPU which copies or makes map-able the actual data transmitted); or obtaining from an application that has an accessible graphics stack from which video gathering and processing sub-application 3044 graphics module can request access to or a copy of (e.g., 'hooking' graphics from applications).

Regardless of which source image capture is used, video gathering and processing sub-application 3044 encodes the next frame data needed from the raw image in the encoder related memory to ensure the output frame is in a network readable mapped memory location, block 430. Embodiments preferably encode 430 the next frame prior to and well-ahead of the prior frame being streamed so that a smooth, high-performance display is achieved. As with preceding steps, encoding 430 may occur in its own separate thread and the result of the manipulation 426 merged with the graphics module thread. Encoding 430 creates packets of the video image frame data. Final image manipulation of the encoded, if any, is performed, block 432. Sometimes the encoded image is not fit for streaming and additional manipulation is needed.

The frame data may be encrypted here as part of loaded graphics module thread, block 434. The video frame packets are sent to the network send-out stack, further packet options are performed and the stack of video frame packets are sent to the network card for streaming, e.g., over data stream 310, block 436. The frame data may be encrypted as shown here, block 438. As indicated, encrypting 434 or encrypting 438 are two optional locations of frame data encryption.

In embodiments described herein, there are two sets of data sent with the frame data. One is contained in the network transmission itself and contains some information on the frame, such as size, timing data, ordering data, critically, format, etc. Other data (such as keys related to encryption, etc.) are sent via a secondary data stream using the front end server—front end client and master server back end. This data is sent to the running lower level applications which are 'doing the bulk of the work' via shared memory space, named pipes, and flat files with update triggers depending on the environment.

With continued reference to FIG. 4, when memory is no longer needed for stream video frame data packets, graphics module of video gathering and processing subapplication 3044 may cleanup old per frame memory and data objects from the last loop, block 440. This is preferable performed during the run-time of next frame (i.e., encoding 430) to save operational time and overhead. When files or data stream 310 is no longer needed, e.g., client front-end 302 terminates or otherwise disconnects from frame server 304, video gathering and processing sub-application 3044 may clean up all data objects and stop graphics module, block 442.

At times when properties need to change, such as changes to output image quality, latency mode (e.g., a reduced latency mode), encryption, GPU utilization, operation mode (e.g., failure mode to go into safe mode (e.g., CPU and generic calls only modes)), source capture settings (e.g., change what screen regions are being captured, etc.), video gathering and processing sub-application 3044 may perform various actions to effect the changes. The actions, which are detailed below, may be performed at various locations or parts of method 400, including, for example, when loading the graphics module 410, loading a specific configuration 412, performing per-frame operations 422-432, performing alternate source image capture 429 or encrypting frame data 434 or 438.

Changes may be made using the following actions:

1. Apply a hot change. Some settings and configuration items may simply be flags that video gathering and processing sub-application 3044 sends the hardware per loop, or flags that are used for copying an image, thresholds for FPS, for a new RSA key, etc., which may just require video gathering and processing sub-application 3044 to perform an on the fly settings change. In such cases video gathering and processing subapplication 3044 simply makes the flagged change.

2. Apply a partial restart of sub-modules and objects. In some cases (for instance, some settings in NVEnc and some settings in AMD hardware encoders) the change requires a new memory space for the operation that cannot be changed on the fly. In these cases, the old sub-module or object is recycled by video gathering and processing sub-application 3044 and a new one is created. This may done, for example, by pausing operations and making this change 'between frames.'

3. In drastic cases, such as 'safe mode' or other major changes, it is more efficient to simple destroy all of the affected objects and start again with the video gathering and processing sub-application 3044. This causes additional delay which is not wanted but is, however, sometime needed. In embodiments, back-up modules may be available on 'hot standby' so that the video gathering and processing sub-application 3044 need to be restarted. If modules are not available on hot standby, the modules' initialization and memory space may be pre-loaded when the overhead for those objects is not detrimental to the specific environment.

4. At some times, embodiments simply close the entire lower level application set and have the upper level simply restart the lower level applications. This is generally only done if the above is not working or some error state is reached or if all users (client front-ends 304) have disconnected etc.

Encryption Sources:

Encryption 434 or 438 may utilize custom encryption software that is based on standard encryption mathematics. Encryption implementation may be modified slightly for security and additionally optimized on use case. Embodiments may make the processes able to view the memory in the network packets with encoded data and user input data and other data directly so that in-memory operations such as bit shifts and other operations that can be written into the same memory location to avoid copies may be performed. To use encryption options such as RSA above a very small number (i.e., 512+) in real time operations it may be necessary to perform such in-memory operations. Making and using copies are slow, so embodiments avoid copying data where ever possible. When necessary ensure that the copy may be used while other operations are ongoing on the other side of the copy to save time and increase throughput. Some of these operations can be done on the GPU.

Lower Level Sub Application(s) for Audio Gathering and Processing 3045

With reference again to FIG. 3, upon initialization of the Audio Encoder, embodiments may allocate space based on the encoder codec, audio bitrate, audio sample rate, audio channels, codec format, and audio codec channel layout, all of which may be pre-determined from the global real time streaming protocol (RTSP) configuration settings.

From this allocation and from the settings, embodiments of audio gathering and processing sub-application 3045 may obtain the source buffer size and the encoder size required to handle the audio information. If the settings between the RTSP configuration settings and the encoder format do not match (e.g., in need of live on-the-fly format conversion), audio gathering and processing sub-application 3045 may convert the audio data and another context will be used, instead of the standard audio context.

In embodiments, after the initialization of the Audio Encoder, main audio gathering and processing sub-application 3045 thread will use a buffer to read in audio information, based on the configuration settings in the global RTSP configuration. The source buffer may be continually being utilized and filled, on another thread, through use of WASPI calls. Using these parameters and measurements, main audio gathering and processing sub-application 3045 thread may take chunks of audio at specific frame sizes, sample rates, and offsets detailed in the global RTSP configuration settings.

With continuing reference to FIG. 3, once a usable chunk of audio information has been obtained, calculated, and properly offset, an Audio Packet may then be filled by audio gathering and processing sub-application 3045. Next, the newly constructed Audio Packet is then sent to an audio encoder subroutine of audio gathering and processing sub-application 3045. If it is the case that on-the-fly format conversion is necessary, the before mentioned non-standard Audio context is used to convert the audio information into a usable format, before the Audio Packet is then filled, as described above.

Once the newly constructed Audio Packet has been sent to the encoder, e.g., via reference pointers, the next place in the audio buffer is calculated and new audio data is then obtained, so that more information can be put into an Audio Packet and subsequently also sent to the audio encoder subroutine.

The audio encoder subroutine takes the data that was provided, and compresses it by a variety of algorithms determined, e.g., by the encoder codec, bitrate, sample rate, channel count, codec format, and audio codec channel layout information. These factors may be set during the initialization process. Once the audio encoder subroutine of audio gathering and processing sub-application 3045 has completed the encoding process, the information returned back to the main audio gathering and processing sub-application 3045 thread. The audio information may then be handed off to a network processing thread. The encoded audio information may then be broken up into network packets and delivered over a network.

The process of reading from the buffer, filling an Audio Packet, encoding of the Audio Packet, and sending to the network processing thread continues, as long as there is information in the audio buffer to process, or the main audio gathering and processing sub-application 3045 thread is allowed to continue running.

Lower Level Sub Application(s) for User Controller Gathering and Processing 3046

With continuing reference to FIG. 3, when the frame server 304 receives any data related to mouse, keyboard, joystick, controller, USB-data, etc., such data may be forwarded to a specific control sub application (DLL), user controller gathering and processing 3046 which handles these calls.

Such a call may be flagged in the network packet data such that it may be easily forwarded to user controller gathering and processing 3046 via direct or semi-direct memory mapping of these sub handlers. In embodiments, this means that if the network data has the flag that represents, e.g., "Xbox controller," the network data will be forwarded efficiently to the thread(s) or related low level drivers for interpretation without the need to evaluate all data in the message beforehand and in such a way that allows for fast processing as the memory location for the sub handler is set in such a way that the flag matches the data location map so little evaluation (such as evaluation of no "if statements") need to be used. This greatly increases speed of operations and reduces latency (i.e., "lag feeling") of controls. This is an important concept and is one of the main areas that allows the data transfer and frame serving software 300 to 'feel' like a local desktop as opposed to a 'traditional' remote environment (e.g., such as Citrix remote desktops which have high 'lag' or 'latency' for user input).

The sub handlers of user controller gathering and processing 3046 may include a thread or function or separate driver (e.g., a custom Xbox controller driver which hooks into the official Xbox controller driver, see Low Level driver section for more details) which will interpret the data in the network packet. However, this data is sent in such a way that no operations need to be done to convert this data, it can be directly mapped in memory already as all parts of this network data are a fixed size (fixed memory blocks) for the transmission. Consequently, embodiments of user controller gathering and processing 3046 may just apply the data without the need for evaluation. This again greatly speeds up system 300 performance.

Lower Level Sub Application(s) for Network Interface 3047

With reference again to FIG. 3, embodiments utilize a low level network interface sub application 3047, which may be written in C++. Embodiments may utilize existing network wrappers that provide stable network handling. In embodiments of network interface sub application 3047, all of the actual data that is sent, the listeners and flags are custom. Embodiments of network interface sub application 3047 build each packet to send for the data streams, e.g., data stream 310, and use constant network paths from the start of each session to the end of the session. If the network becomes unstable, embodiments of network interface sub application 3047 attempt to recover and recreate these networking paths. If network interface sub application 3047 determines the lowerlevel network connections to be unrecoverable the lower level operations restart (e.g., as governed by the upper level server operations).

A major advantage of embodiments of network interface sub application 3047 is that the network packet preparation sections share the same memory address as the final encoder output, allowing embodiments of network interface sub application 3047 to avoid copying memory for some embodiments. This increases throughput, decreasing CPU utilization and memory impact.

In general, network interface sub application 3047 creates a listener on a particular port and then, once the low level client connects and is verified, further networking details and stream information is negotiated between the low level client and low level server. After the negotiation, network interface sub application 3047 starts streaming data to the client and receiving data from the client.

Lower Level Sub Application(s) for Encryption-Decryption 3048

During the initial initialization phase of frame server 304, a set of DLLs that are responsible for handling the encryption and decryption of data may be loaded. This mostly is standard encryption protocols such as RSA, etc. Such encryption may also include "Reverse RSA" portion of the processes which is described in related patent applications.

The implementation of encryption and decryption by encryption-decryption subapplication 3048 may be mostly standard, with some optimization done to allow the feeding of data without conversion and utilization of GPU or other computation devices where available. Optimization and customization may be also made to enable more direct memory mapping between DLLs, as opposed to the standard copying of memory, which saves a good amount of time and allows for faster encryption. As noted above with regards to general system memory, making copies slows operations.

Encryption-decryption sub-application 3048 may also handles the one time password verification and initialization by utilizing a modified standard random generator routine to generate the one time password.

Lower Level Sub Application(s) for Support Tasks 3049

Embodiments of frame server 304 software may utilize several existing drivers and DLLs used as support libraries.

Kernel/Driver Level Interfaces 3050-3052

With continuing reference to FIG. 3, embodiments of frame server 304 use several Kernel level driver interfaces. These and the Kernel level drivers themselves may all be signed using high security digital signatures to allow for the "Trust" of the OS to be gained in accessing Kernel level memory and objects. These act as Kernel interfaces to allow a non-Kernel application with lower OS type security (e.g., does not require the same type of digital signature) to send and receive data from a Kernel level application.

Kernel/Driver Level User Controller Operations 3050

In embodiments, kernel/driver level user controller operations drivers 3050 are Virtual Multiple HID ("human interface device") Drivers, the basis for which may be found in MS Windows Driver Kits. Such drivers are modified to include an accessible memory pipeline which may be called by a Kernel interface driver or modified to allow for runtime on other OS environments such as Linux. Accordingly, kernel/driver level user controller operations drivers 3050 send the OS a code, which is usually reserved for situations when a physical charge is detected on a wire, when the drivers receive the same type of code that has been virtualized for sending by the Kernel Driver Interface. This works specifically by emulating the physical USB (or similar attached device) signal interface that is used to update the OS low level memory and instruction set used by USB devices by flagging the device as using non-standard communication. This emulation performed by kernel/driver level user controller operations 3050 drivers works for any USB type device (as well as some others such as security scanning devices for fingerprints, etc.).

Basically, the kernel/driver level user controller operations drivers 3050 act as a USB driver on the OS presentation side and a virtual interface driver on the other side, as opposed to a presentation to a hardware signal layer. Although this concept has been discussed previously, embodiments of kernel/driver user controller operations drivers 3050 work on a lower level, directly modifying the OS memory and instruction stack. Moreover, kernel/driver level user controller operations drivers 3050 utilize the actual USB or other low level kernel driver pipeline allowing it to work on multiple operating systems and much faster.

As a result, mouse, keyboard, joystick, controller, etc. operations implemented by system 300 can beat traditional systems and compare to a local Bluetooth controller delay on an Xbox gaming system, even though going through network communications.

The ability of kernel/driver level user controller operations drivers 3050 to modify the OS's memory directly without any checks in kernel level is as fast as possible. No other known streaming software uses custom Virtual HID Drivers as its mouse, keyboard, etc. interface. Other known streaming software systems do not attempt to modify the OS's memory directly without any checks in kernel level because to do so is very complex and any errors in the code may corrupt the operating system and or any other software or devices connected to it. As a result, no one does this and no major low level documentation into how to do this has ever been published.

Kernel/Driver Level Video Operations 3051

With reference again to FIG. 3, kernel/driver level video operations drivers 3051 may directly access hardware (e.g., graphics card GPUs or GPU-operation enabled CPUS). At times, vendors attempt to lock down operations on graphics cards or GPU operation enabled CPUs by driver limitations not being able to map some areas on the hardware. Kernel/driver level video operations drivers 3051, which may be mini-HID type drivers, that will directly access this hardware and perform the operations on it by emulating the signals found on the vendor's drivers. System embodiments may overcome vendor lock-down operations by:

1) Modifying the hardware to send a signal that it is a type that it is not by changing some chip or wire on it.
2) Adding a layer between the OS and the Driver to report false information to the driver by creating a HID Driver interface.
3) Implementing kernel/driver level video operations drivers 3051 that directly access the kernel layer.
4) Modifying the hardware to create run-time static memory chips as opposed to writable memory in some locations on a device to prevent changes by the driver or updates.

Kernel/Driver Level Audio Operations 3052

With reference again to FIG. 3, embodiments of kernel/driver level audio operations driver 3052 map audio or graphics resources directly. Many existing audio drivers to not support encoding natively which means system 300 must take a raw audio feed which is non-optimal. While not necessary for all or most use cases, it may be required to implement kernel/driver level audio operations driver 3052 to process audio faster on the client side. If implemented, system 300 inform the OS that all communication from the audio driver should go through kernel/driver level audio operations driver 3052.

Mobile Client (Android/IPhone/etc.) and Non-Mobile Client (PC/Linux/etc.) 302

With continuing reference to FIG. 3, differences between mobile client front-end 302 and non-mobile client front-end 302 are noted below. Overall the logic of the two client 302 types are very similar.

In embodiments, when the client front-end 302 application first starts, there is a textbox or other interface 3021 through which the client can specify a master authentication server 306 to which to connect and transmit credentials. Upon the client front-end 302 attempting to connect (to login) to a master authentication server 306, the client front-end 302 will request a public key from the master authentication server 306. The client front-end 302 will then use the obtained public key to encrypt the client frontend's login credentials before transmitting them to the master authentication server 306.

If the client's credentials are validated by the master authentication server 306, the master authentication server 306 will return a list of RTSP servers (frame servers 304) to which the client front-end 302 can connect. Along with the list of RTSP servers, the master authentication server 306 also returns a corresponding One Time Pass Key Code that has to be used by the client front-end 302 to connect to the corresponding RTSP servers. This One Time Pass Key Code is paired with each RTSP server's IP address and is used during the connection process.

When the client front-end 302 has selected the appropriate RTSP server (frame server 304) to connect to, the connection information, including the One Time Pass Key Code is passed to the lower-level networking controller interface 3022. The lower-level networking controller interface 3022 handles all the incoming communications from the frame server 304 and outgoing communications from the client front-end 302 to the frame server 304. Once the lower-level networking controller interface 3022 receives the information required to connect to an frame server 304, it launches a controller thread that handles the request.

Upon a successful connection the client front-end 302 and the frame server 304 will do a series of handshakes on a number of ports, simultaneously. Even though a series of handshakes may be successful, if one connection on a particular port is not successful, the frame server 304 will disconnect the client front-end 302.

In terms of video processing, when the lower level data processing and gathering 3023 receives incoming packets on a specific port, a buffer is filled and the frames (or partial frame pieces), are ordered in a buffer. Each frame (or partial frame update) contains timing information. If the timing of the frame (or partial frame) has been delayed too long, that information will be discarded and not shown to the client.

This is to reduce any noticeable delay that the client may experience. If the frame (or partial frame information) passes the max tolerable delay test, it will be sent to the video decoder.

In the decoder, the frame information that is received is turned into a bitmap and is temporarily put in a buffer. This, in turn, signals that frame information is available, and the information is received by a thread to process the information. Once the frame information is retrieved from the buffer, the information is then passed to the higher-level Mobile java application and the frame updates (or partial updates) are then drawn to the screen.

With continued reference to FIG. 3, in terms of audio processing, the lower level data processing and gathering 3023 receives incoming packets on a specific port, an audio buffer begins to be filled. When there is enough information in the buffer, partial audio information can begin to be extracted. Upon extraction, the partial audio information is then sent to the audio decoder. The audio decoder looks at the device's channel, layout, and frame rate, and constructs a format suitable for playback. The information is then pushed to a queue where it is signaled that there is audio information available. The available information is then retrieved from the queue, by another thread, and is sent to the higher-level mobile java application system to be utilized by the client.

Both the mobile client front-end and the non-mobile (e.g., PC) client front-end 302 may utilize existing hardware for decoding audio and video. This is accomplished through configuration or detection. If the necessary decoding hardware exists, the application will add the hardware to the pipeline, via low-level hook, handlers, or interface calls. When the decoding hardware is available, the system 300 applications will utilize the available decoding hardware, to save processing power and improve performance of the client device in use. Embodiments of mobile client front-end 302 make use of standard OS calls to register for use any existing h264 hardware decoder or hardware options for RSA, etc. encryption/decryption. These are standard mobile OS calls. A non-mobile, e.g., PC (Windows, Linux, etc.) client front-end 302 detects (e.g., via standard OS calls to device manager) what hardware is available on the client side and instantiates decoding, encryption and decryption using these objects, if available. For example, if there is a hardware h264 decoder available on the client hardware that client front-end 302 can use, h264 decoding processes are forward to this hardware using the vendor's SDKs. Otherwise client front-end uses standard DirectX, etc. objects and allows the system 300 to handle it generically. Playback of streams may be performed according to standard playback means.

In terms of an on-screen keyboard, or other virtual devices such as an Xbox controller etc., a higher-level mobile java application 3021 continuously listens for any screen touches that result in a virtual keyboard key being pressed. Once the key has been pressed, the higher-level mobile java application 3021 then sends keyboard input information to the lower-level networking layer 3022, that runs below the mobile application 3021. At lower-level networking layer 3022 the information is reformatted into a usable keyboard information packet and is then sent to the frame server 304, on a specific port. In terms of mouse clicks, resulted by the client touching the screen in the appropriate locations (either a designated right and left mouse button setup or by touching the screen), the mobile java application 3021 will detect these touches, gathers the appropriate information, and sends it to the lower-level networking layer 3022. Once on the lower-level 3022, the resulting virtual mouse information is then converted into a usable mouse information packet and is sent to the frame server 304 on a specific port. In terms of mouse motions (moving the mouse cursor by touching and dragging the mouse icon), the application 3021 detects the movement and gathers the new location of the mouse position, gathers this information, and sends it to the lower-level networking layer 3022. Once on the lower-level, the resulting virtual mouse motion information is then converted into a usable mouse information packet. In terms of the available virtual gaming controller that appears on the screen, the application 3021 continuously listens for button and joystick input. The input the application 3021 is looking for is segmented by area on the device's screen. Joystick areas will be listening for finger movement and buttons will be listening for finger presses. Once any one particular action has happened (either a virtual joystick movement detected or a virtual button has been pressed), the application 3021 takes that information and then sends it to the lower-level networking layer 3022. The virtual joystick information is then converted into a usable joystick information packet and is sent back to the frame server 304, on a specific port. In terms of the available Bluetooth gaming controller option, when the Bluetooth controller (or wired controller if available which works the same way) option has been selected, the mobile device will continually listen for a comparable Bluetooth game controller to connect to the device. Once the Bluetooth game controller has been connected, the application 3021 can then be started. When in Bluetooth game controller mode, the application 3021 is continually listening for any Bluetooth game controller information. This is handled on the higher-level mobile java application 3021. Once the application 3021 detects either joystick movement, d-pad movement, or button presses on the Bluetooth device, the application 3021 then extracts usable information (such as joystick position, button state changes), and sends that information to the lower-level networking layer 3022. Once the lower-level has received the Bluetooth controller information, it then converts that information into a usable joystick information packet, and is set to the frame server 304, on a specific port.

Both the non-mobile and mobile client front-ends 304 have client service listeners, that listen for sent information from frame servers 304, regarding devices such as printer information or other device information (such as the ability for the server to print on a client-side accessible printer, or haptic feedback on an Xbox Controller or Mobile device). The major difference between non-mobile and mobile client front-end 304 listeners is the access level. Mobile devices do not typically allow access to all other objects and may not allow printing, for example, as each app and app hooks are different. On a PC, however, printing is a standard function and all print documents may be passed using standard print file objects. Most USB objects may be passed through on a nonmobile system via hooking in as a USB controller on the kernel layer to allow forwarding of this data to a kernel level USB controller which matches on the frame server 304 side. There is no such kernel level hooking possible on a locked mobile OS which limits the types of devices that can forward.

Master Authentication Server 306

Instantiation of the Master Server "Client & Frame Server" Listeners

With reference now to FIG. 3, embodiments instantiate multiple listener sets in authentication server 306, for each type of client supported communication anticipated to be received in a given environment (e.g., TCP, UDP, WPF Pipes, HTTP, HTTPS, and variations thereof). The listeners have been optimized for compatibility for the specified client types. Each connection, or session, depending on the client connection type, spawns an instance of the listeners. Each listener of each type, generates one, or many WPF Gates and are managed by a manager set. The connection types that are established are pooled by type and managed within their own stack.

Embodiments of authentication server 306 instantiate the same listener sets for the frame server listeners as for client listeners, albeit in different stacks. For both the frame and client pools, listeners are instantiated with a configuration that is specified by either session, transmission, or message, for the communication that is going to be done within a particular stack. Then, for both client and frame server listeners, the actual content of the message utilizes RSA keys such that there are two layers of encryption, depending on the stream specifications or requirements.

Embodiments of authentication server 306 instantiate a directly related listener set to communicate with other authentication servers 306.

Frame (RTSP) Server Registration with Master Server

When a frame server 304 registers with a authentication server 306, the frame server 304 requests a public key from the authentication server 306. With the public key, the frame server 304 sends encrypted credentials to the authentication server 306. Upon a successful login type event, the frame server 304 then starts up the RTSP service, requests a new public key, and sends an encrypted One Time Pass Key with the authentication server 306. Once the authentication server 306 has the One Time Pass Key, the frame server 304 then sends a registration request to the authentication server 306. Once the frame server 304 is registered with the authentication server 306 and the One Time Pass Key has been sent, the frame server 304 then requests an encrypted license file from the authentication server 306. The encrypted license file is then returned to the frame server 304 and is consumed by the frame server 304, to dictate how long the frame server 304 may remain in an operational state, without having to re-register with the authentication server 306 (e.g., a few minutes to approximately an hour, although may be lengthened to allow for extended maintenance etc.).

When a frame server 304 registers, the authentication server 306 then updates a list of current registered frame server 304. It is expected that the frame server 304 will check in periodically and send information, letting the authentication server 306 know that the frame server 304 is still available to be connected. If a frame server 304 fails to check in, within a predetermined length of time, the authentication server 306 will purge all information related to that particular frame server 304, resulting in client front-ends 302 being unable to connect to that particular frame server 304.

Client Connections to the Master Server

When a client front-end 302 has successfully authenticated with the authentication server 306 and is not in the "direct to Frame Server" mode, a list of currently available frame servers 304 is returned to the client front-end 302. Included with the returned information is a One Time Pass Key, that the frame server 304 registered with the authentication server 306. This One Time Pass Key is used by the client front-end 302 to connect, once, to the frame server 304. The list that is returned is directly linked to the credentials that the client front-end 302 used to authenticate.

Each time the client front-end 302 authenticates with the authentication server 306, and requests an updated list of available frame servers 304, only the frame servers 304 that are currently active, at the time of request, will be returned to the client front-end 302.

Communication with other Master Servers

Communication with other authentication servers 306 is related primarily to status and load balancing (shifting users to other connections as needed for performance reasons) as well as rolling patches or maintenance work (so that not all of the servers are taken out at the same time).

Figure 5:
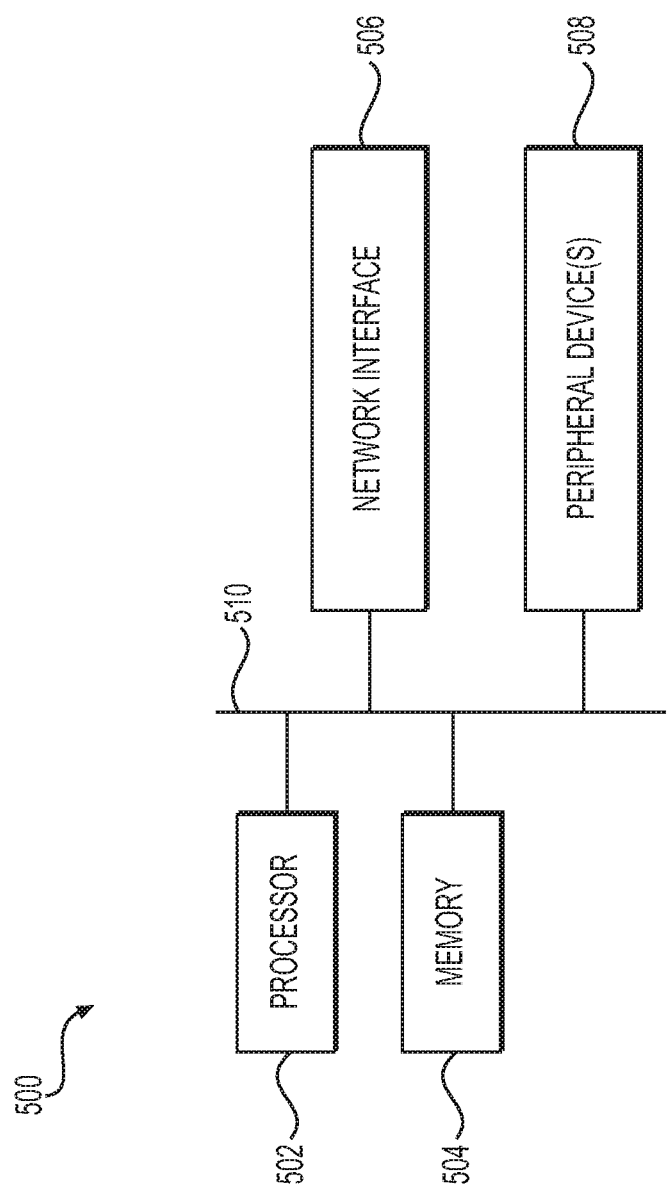
FIG. 5 is a block diagram of a computing device, according to one or more embodiments.

With reference now to FIG. 5, shown is a block diagram 500 of a computing device that may be employed as one or more of the client front end 102/302, frame server 104/304, and/or authentication server 106/306, according to one or more embodiments. In the embodiment depicted, the diagram 500 includes a processor 502, a memory 504, a network interface 506, and one or more peripheral device(s) 508.

The processor 502 may be comprised of, for example and without limitation, one or more processors (each processor having one or more cores), microprocessors, field programmable gate arrays (FPGAs), application specific integrated circuits (ASICs) or other types of processing units that may interpret and execute instructions as known to those skilled in the art. Accordingly, the processor 502 may be comprised of a central processing unit (CPU) and an accelerated processing unit (APU) or graphics processing unit (GPU), thereby enabling increased ability to perform graphics processing.

The block diagram 500 further includes various types of memory 504, such as a hard drive and/or random access memory (RAM). Hard drive(s) may be any type of memory known to those skilled in the art capable of storing data or executable instructions thereon for a prolonged period of time, and continuing to store such should power to the computer (e.g., the client front end 102, client server 104, or authentication server 1 06) be turned off. Examples of such include, without limitation, all variations of non-transitory computer-readable hard disk drives, inclusive of solid-state drives. Other embodiments of the memory 504 may alternatively or additionally include random access memory (RAM). RAM may be external to computer, or in other embodiments be internal (e.g., "on-board" memory) to computer, and work in coordination with any hard drive to store and/or execute programs and/or process graphics data, etc. Example embodiments of RAM may include, without limitation, volatile or non-volatile memory, DDR memory, Flash Memory, EPROM, ROM, or various other forms, or any combination thereof generally known as memory or RAM.

The network interface 506 may be any interface capable of sending and receiving data via a network. Examples may include, but are not limited to, hard-wired network interface card(s) (NIC), and/or wireless network interfaces, including those capable of transmitting data over a cellular provider network. The network interface 506 may be configured to communicate over one or more of a local area network (LAN), wide area network (WAN), cellular provider network (or "mobile network"), along with "cloud" networks.

The peripheral device(s) 508 may include, for example and without limitation, a keyboard, mouse, and/or display. For example, the client server 104 and authentication server 106, which, in at least one embodiment are hosted on the same computer, may initially be configured or updated via a locally connected mouse, keyboard, and/or monitor. Alternatively, such may be remotely configured, for example, via a remote login over a network. The client front end 102 may vary from a desktop computer, to a portable computing device such as a laptop, tablet, iPad, etc., to a cellular device.

Therefore, in some embodiments, the peripheral device 508 may include a touch screen display or embedded display (e.g., mobile devices). One or more of the processor 502, memory 504, network interface 506, and peripheral device (s) 508 are communicably coupled via one or more busses 510.

Embodiments of data transfer and video frame serving system and method, and particularly video gathering and processing method as described herein have numerous advantages of the prior art. For example, embodiments may force memory to write to same, known location, reducing overhead to gather video data from memory. For example, embodiments may instantiate a memory location which is on the GPU where the GPU has stored a copy of its frame data. This location may be manipulated to be a direct map of CPU accessible memory allowing all operations from the time of the actual frame creation to the time of the final copy to network resource for sending out to be done on the same memory location. This is done by "unsafe" memory access writing which is accomplished by closely controlling when the GPU will write the next frame data into this object.

Likewise, when streaming frame data, embodiments may send only a delta of the differences from frame to frame. Embodiments may map/analyze delta of frame either with: GPU driver specified parameters, such as a graphics driver available encoder which in some cases generates this delta data (a "new" delta based on the initialization used for the encoder) or either prior to encoding or after encoding depending on the available environment. If done prior to the encoding, a modified image data set delta (where in cases such as NvEnc (Nvidia hardware encoder)), embodiments take the root captured image (from some source) and run it through a mathematically defined GPU (if available otherwise CPU) running function that takes the bits of difference and with minimal system time presents the delta of raw pixel data image format. This allows embodiments to send the hardware encoder (or software encoder) a much smaller image data and set up the encoder such that if it has 'Null" image data sections it will simply not process those sections and will, therefore, save processing time. This also reduces the size of the resulting encoded data which speeds up encryption, decryption, reduces transmission size, and speeds up play back (smaller images and image deltas are faster to process).

If done after encoding, embodiments may manipulate the encoded frame to reduce the impact of "close enough" data areas where the data is actually the same. Examples of this include reducing the frame resolution size to blur some data, to increase data transmission and play back speed. Embodiments may do this by a very similar mathematical function to the one above using a linear algebra function capable of running on the GPU (if available) which the post processing is run.

Embodiments may send the delta of frame data to encoder either with SDK specified driver calls to the hardware or overloaded calls for which embodiments wrap a modified data set into the SDK's data package to get the hardware to preform wanted operations on some additional data. This means that at times if the driver SDK says submit data XYZ, embodiments can submit X_Z allowing the processing to occur faster, etc. This is in essence overloading the purpose of the driver hooks available. This varies a lot based upon various environments and would be best discussed over the phone.

Embodiments may also determine and apply different encoder settings (quality, lossless, color, bit depth). For example, different settings may be based on e.g., whether static or moving scene—higher resolution if static, manual configuration (user may say want loss-less, or Game Mode, etc., or if the following occur. For example, if the encoder is taking too long to create next frame: some hardware encoders on the driver hook initialization level allow for the upper bound to be set such that the encoder processing will not be allowed to take over X time, else reduce the resolution automatically;

some hardware encoders which do not support the above may allow for some dynamic settings such that embodiments can control the encoding 'quality' threshold when a delay is detected; s some hardware encoders which do not support the above may allow for the reinitiation of the encoder process itself in a relatively fast manor (specifically by per-registering objects and memory addresses associated with another encoder and its related data pipelines) or allow for a $2^{nd}$ (or Nth) encoder to be registered using different parameters. Embodiments may then may switch between these instances where we have set up each differently. Embodiments only need to send a single full frame when switching between them to make it 'seamless' from one delta set to another. May also be done with software encoders.

encoders may be configured to attempt to 'build to loss-less' the fastest method of this is just the full frame send from time to time as it accomplishes the same task without any additional work or processing overall. This allows 'null frames' to be sent after this whole frame if there is no change (static view).

Embodiments may also maximize the use of GPUs instead of CPUs to achieve greater performance. For example, the following processes may be performed on a GPU with little or no CPU impact:

Graphics source capture

Audio source capture—partial—can remove some in some specific chip sets via some drivers such as AMD drivers which have hooks into system Audio in some cases Graphics pre encoding processing (crop/etc.)

Graphics encoding

Graphics post encoding processing (balancing/etc.)

Audio processing

Audio encoding

Packing data into a network format memory object (so that system may only copy this final network packet out via CPU from GPU space to send to the network card once)

Some user controls, such as some printing commands

Some forms of encryption and decryption (as they may be operated in forms of linear algebra which may be processed as GPU commands)

Graphics Decoding

Some Audio decoding

Displaying the final image on a container (using Direct X, Android hardware for displaying graphics, etc.)

Encryption-decryption.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A computerized method of video gathering and processing, comprising:
- loading a pre-defined base configuration into a memory of a client device;
- detecting the environment of the client device in which video frames will be generated and displayed, wherein the detection identifies specific hardware and software environmental conditions particular to the client device that include at least the set of GPUs and CPUs available as resources;
- noting a user connection from the client device or a file/data stream output start;
- initializing required global memory and data objects associated with the client device;
- loading a graphics module into the memory and one or more processors of the client device executing the loaded graphics modules, wherein the graphics module is loaded based on the base configuration and detected environment and the executing comprises:
- loading a specific configuration related to run-time of a specific graphics case, wherein the loaded configuration includes at least items related to the specific hardware and software environmental conditions particular to the client device;
- initializing drivers, DLLs, and all base low level or GPU-related memory objects and hooks that will be used by the loaded graphics module;
- initializing threads for tasks such as graphics pulls, image manipulation and encoding;
- initializing per frame memory and data objects used for per frame operations;
- capturing raw source image data for the video frames using one or more initialized hooks; and
- encoding video frame data from the raw source image data, wherein the raw source image data is moved into an encoder to create data packets of the video frame data;
- sending the encoded video frame data packets to a network stack, wherein a next video frame data packet is encoded prior to a previous video frame data packet; and
- streaming the encoded video frame data packets from the network stack in the order of the encoding.

2. The method of claim 1 wherein the capturing raw source image data comprises moving the raw source image data into a GPU memory location related to an encoder.

3. The method of claim 2 wherein the encoding video frame data encodes the raw source image data from the GPU memory location related to the encoder.

4. The method of claim 1 wherein the streamed video frame data includes audio and other data.

5. The method of claim 1 wherein the capturing raw source image data comprises sending an encoder the location of the raw source image data.

6. The method of claim 1 wherein the capturing raw source image data comprises enabling the encoding video frame data to encode the video frame data without making a copy of the raw source image data.

7. The method of claim 1 wherein the executing the loaded graphics module and the encoding video frame data from the raw source image data are executed as software threads.

8. The method of claim 1 further comprising encrypting the encoded video frame data.

9. The method of claim 1 further comprising manipulating the raw source image data.

10. The method of claim 1 wherein the capturing raw source image data captures the raw source image date from an optimized memory location.

11. The method of claim 1 wherein the capturing raw source image data captures the raw source image date from GPU memory location.

12. The method of claim 1 wherein the capturing raw source image data captures the raw source image date from a previously mapped memory location.

13. The method of claim 1 further comprising manipulating the encoded video frame data.

14. The method of claim 1 wherein the capturing raw source image data is performed as a separate thread from the executing the loaded graphics module.

* * * * *